US010445036B2

(12) United States Patent
Inoue et al.

(10) Patent No.: US 10,445,036 B2
(45) Date of Patent: Oct. 15, 2019

(54) COMMUNICATION DEVICE, AND NON-TRANSITORY COMPUTER-READABLE RECORDING MEDIUM STORING COMPUTER-READABLE INSTRUCTIONS FOR TERMINAL DEVICE

(71) Applicant: Brother Kogyo Kabushiki Kaisha, Nagoya-shi, Aichi-ken (JP)

(72) Inventors: Takuya Inoue, Nisshin (JP); Hirotaka Asakura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/142,581

(22) Filed: Sep. 26, 2018

(65) Prior Publication Data

US 2019/0102123 A1 Apr. 4, 2019

(30) Foreign Application Priority Data

Sep. 29, 2017 (JP) .................................. 2017-189948

(51) Int. Cl.
*G06F 3/12* (2006.01)
*H04W 84/12* (2009.01)
*H04W 84/20* (2009.01)

(52) U.S. Cl.
CPC .......... *G06F 3/1236* (2013.01); *G06F 3/1204* (2013.01); *G06F 3/1292* (2013.01); *H04W 84/12* (2013.01); *H04W 84/20* (2013.01)

(58) Field of Classification Search
CPC .... G06F 3/1236; G06F 3/1204; G06F 3/1292; H04W 84/12; H04W 84/20
See application file for complete search history.

(56) References Cited

U.S. PATENT DOCUMENTS 9,986,591 B2   5/2018  Yada
2013/0260818 A1  10/2013  Suzuki et al.
2015/0031404 A1   1/2015  Yada
(Continued)

FOREIGN PATENT DOCUMENTS

JP   2013-214803 A   10/2013
JP   2015-023538 A    2/2015
JP   2017-092705 A    5/2017

OTHER PUBLICATIONS

Wi-Fi Alliance Technical Committee P2P Task Group, "Wi-Fi Peer-to Peer (P2P) Technical Specification", Version 1.5, pp. 1-183, 2014.

*Primary Examiner* — Moustapha Diaby
(74) *Attorney, Agent, or Firm* — Banner & Witcoff, Ltd.

(57) ABSTRACT

A communication device may set a second value instead of a first value as an upper limit child station number in a case where a first signal including a predetermined character string is received from a first external device under a situation where the first value is set as the upper limit child station number in the communication device and a participating child station number is equal to the first value. In a case where the second value is set instead of the first value as the upper limit child station number, the communication device may establish a wireless connection with the first external device via the first wireless interface so as to cause the first external device to participate as a child station in the wireless network.

17 Claims, 11 Drawing Sheets

(56) References Cited

U.S. PATENT DOCUMENTS

| | | | |
|---|---|---|---|
| 2016/0004497 A1* | 1/2016 | Nishi | H04W 76/15 |
| | | | 358/1.15 |
| 2016/0316511 A1 | 10/2016 | Suzuki et al. | |
| 2018/0167955 A1* | 6/2018 | Prakash | H04W 72/10 |

* cited by examiner (Case C)

FIG. 6 (Case D)

FIG. 10
(Fourth Embodiment)
(Case H1)
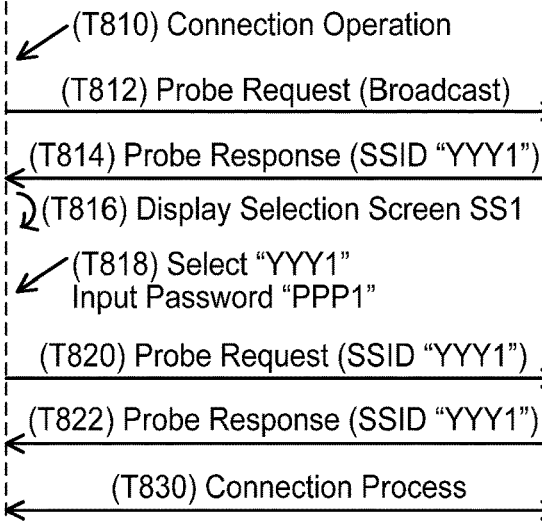
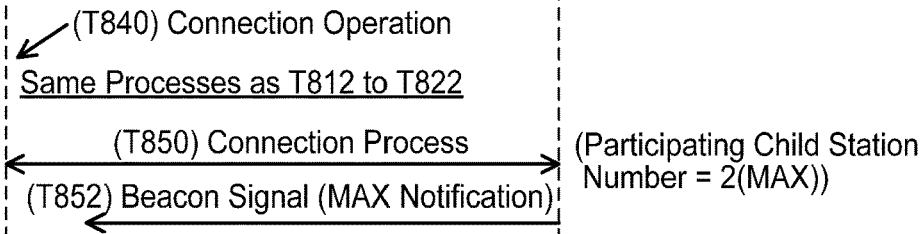
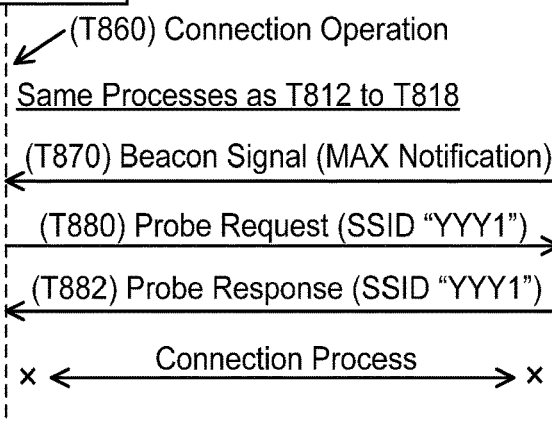

COMMUNICATION DEVICE, AND NON-TRANSITORY COMPUTER-READABLE RECORDING MEDIUM STORING COMPUTER-READABLE INSTRUCTIONS FOR TERMINAL DEVICE

CROSS-REFERENCE TO RELATED APPLICATION

This application claims priority to Japanese Patent Application No. 2017-189948, filed on Sep. 29, 2017, the entire contents of which are hereby incorporated by reference into the present application.

TECHNICAL FIELD

The disclosure herein discloses a technique for causing an external device to participate as a child station in a wireless network in which a communication device operates as a parent station.

BACKGROUND ART

A communication system including an MFP (abbreviation of Multi-Function Peripheral) and a mobile terminal is known. In a case where the MFP receives NFC (abbreviation of Near Field Communication) information from the mobile terminal, the MFP sends, to the mobile terminal, a wireless setting to be used in a wireless network in which the MFP operates as a parent station. Thereby, by using the wireless setting, the mobile terminal can establish a wireless connection with the MFP, and participate as a child station in the wireless network.

SUMMARY

Normally, in a communication device, an upper limit child station number is determined. The upper limit child station number is an upper limit of a number of child stations allowed to participate as child stations in a wireless network in which the communication device operates as a parent station. Under a situation where the number of child stations currently participating in the wireless network is equal to the upper limit child station number, the communication device cannot cause another device to participate as a child station in the wireless network.

The disclosure herein provides a technique for allowing a device with a high necessity of participating in a wireless network to participate in the wireless network under a situation where the number of child stations currently participating in the wireless network is equal to an upper limit child station number.

A communication device disclosed herein may comprise: a first wireless interface; a processor; and a main memory storing computer-readable instructions therein, the computer-readable instructions, when executed by the processor, causing the communication device to: in a case where a first signal including a predetermined character string is received from a first external device under a situation where a participating child station number is less than an upper limit child station number, establish a wireless connection with the first external device via the first wireless interface so as to cause the first external device to participate as a child station in a wireless network in which the communication device operates as a parent station, the participating child station number being a number of child stations currently participating in the wireless network, and the upper limit child station number being an upper limit of a number of child stations that are allowed to participate in the wireless network; in a case where a second signal not including the predetermined character string is received from a second external device under the situation where the participating child station number is less than the upper limit child station number, establish a wireless connection with the second external device via the first wireless interface so as to cause the second external device to participate as a child station in the wireless network; in a case where the first signal is received from the first external device under a situation where a first value is set as the upper limit child station number in the communication device and the participating child station number is equal to the first value, set a second value instead of the first value as the upper limit child station number in the communication device, the second value being greater than the first value, wherein in a case where the second signal is received from the second external device under the situation where the first value is set as the upper limit child station number in the communication device and the participating child station number is equal to the first value, the first value is maintained as the upper limit child station number; and in a case where the second value is set instead of the first value as the upper limit child station number due to the first signal being received from the first external device under the situation where the participating child station number is equal to the first value, establish a wireless connection with the first external device via the first wireless interface so as to cause the first external device to participate as a child station in the wireless network, wherein in a case where the first value is maintained as the upper limit child station number due to the second signal being received from the second external device under the situation where the participating child station number is equal to the first value, a wireless connection with the second external device is not established.

A communication device disclosed herein may comprise: a first wireless interface; a second wireless interface different from the first wireless interface, a maximum distance with which a wireless communication can be executed via the second wireless interface is shorter than a maximum distance with which a wireless communication can be executed via the first wireless interface, a processor; and a main memory storing computer-readable instructions therein, the computer-readable instructions, when executed by the processor, causing the communication device to: in a case where a first signal is received from a first external device via the second wireless interface under a situation where a participating child station number is less than an upper limit child station number, establish a wireless connection with the first external device via the first wireless interface so as to cause the first external device to participate as a child station in a wireless network in which the communication device operates as a parent station, the participating child station number being a number of child stations currently participating in the wireless network, and the upper limit child station number being an upper limit of a number of child stations that are allowed to participate in the wireless network; in a case where a second signal is received from a second external device via the first wireless interface, without receiving the first signal from the second external device via the second wireless interface, under the situation where the participating child station number is less than the upper limit child station number, establish a wireless connection with the second external device via the first wireless interface so as to cause the second external device to participate in the wireless network as a child station; in a case where the first signal is received from the first external device via the second wireless interface under a situation where a first value is set as the upper limit child station number in the communication device and the participating child station number is equal to the first value, set a second value instead of the first value as the upper limit child station number in the communication device, the second value being greater than the first value, wherein in a case where the second signal is received from the second external device via the first wireless interface, without receiving the first signal from the second external device via the second wireless interface, under the situation where the first value is set as the upper limit child station number in the communication device and the participating child station number is equal to the first value, the first value is maintained as the upper limit child station number; and in a case where the second value is set instead of the first value as the upper limit child station number due to the first signal being received from the first external device via the second wireless interface under the situation where the participating child station number is equal to the first value, establish a wireless connection via the first wireless interface with the first external device so as to cause the first external device to participate as a child station in the wireless network, wherein in a case where the first value is maintained as the upper limit child station number due to the second signal being received from the second external device via the first wireless interface, without receiving the first signal from the second external device via the second wireless interface, under the situation where the participating child station number is equal to the first value, a wireless connection with the second external device is not established.

Further, a non-transitory computer-readable recording medium storing computer-readable instructions for a terminal device is disclosed herein. A non-transitory computer-readable recording medium storing computer-readable instructions for a terminal device, wherein the computer-readable instructions, when executed by a processor of the terminal device, may cause the terminal device to: receive a target SSID (abbreviation of Service Set Identifier) from a communication device via a second wireless interface of the terminal device, the target SSID being an SSID of a wireless network in which the communication device operates as a parent station; send a predetermined signal including the target SSID and a predetermined character string to the communication device via a first wireless interface of the terminal device in a case where the target SSID is received, the predetermined character string being for setting a second value instead of a first value as an upper limit child station number in the communication device, the upper limit child station number being an upper limit of a number of child stations that are allowed to participate in the wireless network, wherein a maximum distance with which a wireless communication can be executed via the second wireless interface is shorter than a maximum distance with which a wireless communication can be executed via the first wireless interface; and supply an instruction for participating as a child station in the wireless network to the first wireless interface after the predetermined signal has been sent to the communication device.

A control method, computer-readable instructions, and a computer-readable recording medium storing the computer-readable instructions for implementation of the aforementioned communication device are also novel and useful. The terminal device itself realized by the aforementioned computer-readable instructions and a control method of the terminal device are also novel and useful. A communication system which comprises the aforementioned communication device and another device (e.g., first and second external devices, a terminal device) is also novel and useful.

BRIEF DESCRIPTION OF THE DRAWINGS

FIG. 10 shows a sequence diagram of a case H1 in which a Wi-Fi connection is established between the printer 10 and the mobile terminal 200A and 200B in a fourth embodiment.

EMBODIMENTS

Figure 1:
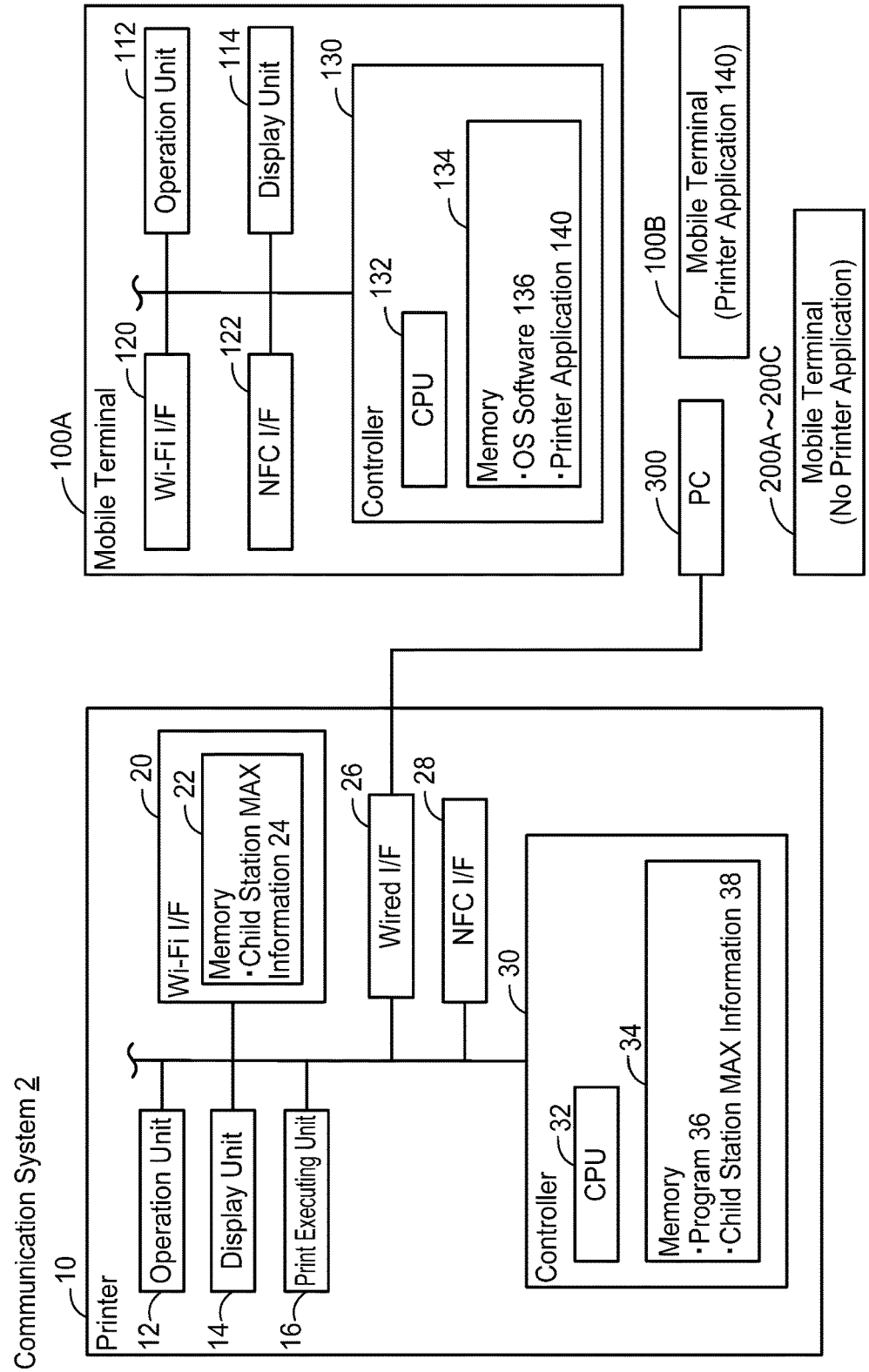
FIG. 1 shows a configuration of a communication system.

First Embodiment (Configuration of Communication System 2; FIG. 1)

As shown in FIG. 1, a communication system 2 comprises a printer 10, a plurality of mobile terminals 100A, 100B, 200A to 200C, and a PC 300. The printer 10 and each of the mobile terminals 100A and the like are capable of mutually executing a Wi-Fi communication which is a wireless communication according to a Wi-Fi scheme, and are capable of mutually executing an NFC communication which is a wireless communication according to an NFC (abbreviation of Near Field Communication) scheme. The printer 10 and the PC 300 are capable of mutually executing a wired communication.

(Configuration of Printer 10)

The printer 10 is a peripheral device (e.g., a peripheral device of the PC 300, etc.) capable of executing a print function. The printer 10 comprises an operation unit 12, a display unit 14, a print executing unit 16, a Wi-Fi interface (interface will be referred to as "I/F" below) 20, a wired I/F 26, an NFC I/F 28, and a controller 30.

The operation unit 12 comprises a plurality of keys. A user can input various instructions to the printer 10 by operating the operation unit 12. The display unit 14 is a display for displaying various types of information. The display unit 14 also functions as a so-called touch panel. That is, the display unit 14 also functions as an operation unit. The print executing unit 16 is a print mechanism of an ink jet scheme, a laser scheme, or the like.

The Wi-Fi I/F 20 is an I/F for executing Wi-Fi communication according to the Wi-Fi scheme. The Wi-Fi scheme is a wireless communication scheme based on, for example, IEEE (abbreviation of The Institute of Electrical and Electronics Engineers, Inc.) standard 802.11 and standards conforming thereto (e.g., 802.11a, 11b, 11g, 11n, etc.). The Wi-Fi I/F 20 supports, in particular, a WFD (abbreviation of Wi-Fi Direct (registered trademark)) scheme formulated by Wi-Fi Alliance. The WFD scheme is a wireless communication scheme described in the standard document "Wi-Fi Peer-to-Peer (P2P) Technical Specification Version 1.5" created by the Wi-Fi Alliance.

The printer 10 is capable of operating in any state of Group Owner state, Client state, and device state of the WFD scheme. Below, Group Owner and Client will be referred to as "G/O" and "CL", respectively. In a case where the printer 10 operates in the G/O state, the printer 10 forms a WFD network (referred to as "WFDNW" below) in which the printer 10 operates as G/O. In that case, the printer 10 can establish a Wi-Fi connection with an external device, and cause the external device to participate as a child station (e.g., CL) in the WFDNW. An upper limit child station number, which is an upper limit of a number of child stations allowed to participate in the WFDNW in which the printer 10 operates as the parent station, is determined in advance according to specifications (i.e., processing capacity) of the printer 10, and the upper limit child station number is "3" in the present embodiment. However, in the present embodiment, the printer 10 changes the value of the upper limit child station number, depending on situation. The printer 10 may set "3" as the upper limit child station number according to the specifications of the printer 10, or may set a value less than "3" (e.g., "1" or "2") as the upper limit child station number. However, in order to avoid the upper limit child station number exceeding the specifications of the printer 10, the printer 10 does not adopt a value equal to or greater than "4" as the upper limit child station number. Below, "3", which is determined according to the specifications of the printer 10, will be referred to as a capacity upper limit number.

As described above, the printer 10 can set a value (e.g., "2") less than the capacity upper limit number (i.e., "3") as the upper limit child station number. Under a situation where the printer 10 sets a value less than the capacity upper limit number as the upper limit child station number and a number of child stations participating in the WFDNW is equal to the upper limit child station number, the printer 10 basically does not cause an external device to participate as a child station in the WFDNW. However, in a case where a predetermined condition is satisfied, the printer 10 increases the upper limit child station number and causes an external device to participate as a child station in the WFDNW. Thereby, an external device with a high necessity of participating in the WFDNW can appropriately participate in the WFDNW.

Further, in a case where an external device is forming a WFDNW by operating in the G/O state, the printer 10 can establish a Wi-Fi connection with the external device and participate in the WFDNW as CL. The device state is a state which is neither the G/O state or the CL state.

The Wi-Fi I/F 20 comprises a memory 22. The memory 22 stores child station MAX information 24 indicating the upper limit child station number. Any value that is equal to or greater than 1 and equal to or less than 3 (i.e., the capacity upper limit number) is set as the child station MAX information 24.

One of a wired cable is connected to the wired I/F 26. The other end of the wired cable is connected to the PC 300.

The NFC I/F 28 is an I/F for executing NFC communication according to the NFC scheme. The NFC scheme is a wireless communication scheme based on international standards, such as e.g., ISO/IEC14443, 15693 and 18092.

Next, differences between the Wi-Fi I/F 20 and the NFC I/F 28 will be described. A communication speed of Wi-Fi communication via the Wi-Fi I/F 20 (e.g., maximum communication speed is 11 to 600 Mbps) is faster than a communication speed of NFC communication via the NFC I/F 28 (e.g., maximum communication speed is 100 to 424 Kbps). Further, a frequency of carrier wave (e.g. 2.4 GHz band or 5.0 GHz band) in Wi-Fi communication via the Wi-Fi I/F 20 is different from a frequency of carrier wave (e.g. 13.56 MHz band) in NFC communication via the NFC I/F 28. Further, a maximum distance with which Wi-Fi communication via the Wi-Fi I/F 20 can be executed (e.g., about 100 m at maximum) is greater than a maximum distance with which NFC communication via the NFC I/F 28 can be executed (e.g., about 10 cm at maximum).

The controller 30 comprises a CPU 32 and a memory 34. The CPU 32 executes various processes in accordance with a program 36 stored in the memory 34. The memory 34 is constituted of a volatile memory, a non-volatile memory, and the like. Further, the memory 34 stores child station MAX information 38 indicating the upper limit child station number.

(Configuration of Mobile Terminal 100A)

The mobile terminal 100A is a portable terminal device such as a mobile telephone, a smartphone, a PDA, a portable music playback device or a portable movie playback device. The mobile terminal 100A comprises an operation unit 112, a display unit 114, a Wi-Fi I/F 120, an NFC I/F 122, and a controller 130.

The operation unit 112 comprises a plurality of keys. The user can input various instructions to the mobile terminal 100A by operating the operation unit 112. The display unit 114 is a display for displaying various types of information. The display unit 114 also functions as a so-called touch panel. That is, the display unit 114 also functions as an operation unit. The Wi-Fi I/F 120 and the NFC I/F 122 are the same as the Wi-Fi I/F 20 and the NFC I/F 28 of the printer 10, respectively.

The controller 130 comprises a CPU 132 and a memory 134. The CPU 132 executes various processes in accordance with OS (abbreviation of Operating System) software 136 stored in the memory 134. The OS software 136 is software for controlling various basic operations of the mobile terminal 100A. Further, the memory 134 also stores a printer application 140. The printer application 140 is an application provided by a vendor of the printer 10 and is installed in the mobile terminal 100A, for example, from a server on the Internet. The printer application 140 is an application for establishing a Wi-Fi connection between the mobile terminal 100A and the printer 10 and for sending data representing an image of a print target to the printer 10 by using the Wi-Fi connection. Below, the printer application 140 will be called "app 140".

The mobile terminal 100B comprises the same configuration as the mobile terminal 100A. Further, the mobile terminals 200A to 200C comprise the same configuration as the mobile terminal 100A, except that they do not comprise the app 140.

(Process Executed by Devices 10, 100A, etc.; FIG. 2 to FIG. 6)

Processes executed by the devices 10, 100A, and the like will be described with reference to FIG. 2 to FIG. 6. In each of the figures, thick arrows indicate NFC communication via an NFC I/F (e.g., 28, 122), and thin arrows indicate Wi-Fi communication via a Wi-Fi I/F (e.g., 20, 120). Below, the term "via the NFC I/F (or via the Wi-Fi I/F)" will be omitted unless there is a particular need when communication is described. Further, below, when processes executed by the CPUs 32, 132 of the devices 10, 100A, and the like are described, the CPUs may be described as subject of action, and the devices (e.g., the printer 10), not the CPUs, may be described as subject of action unless there is a particular need.

Figure 2:
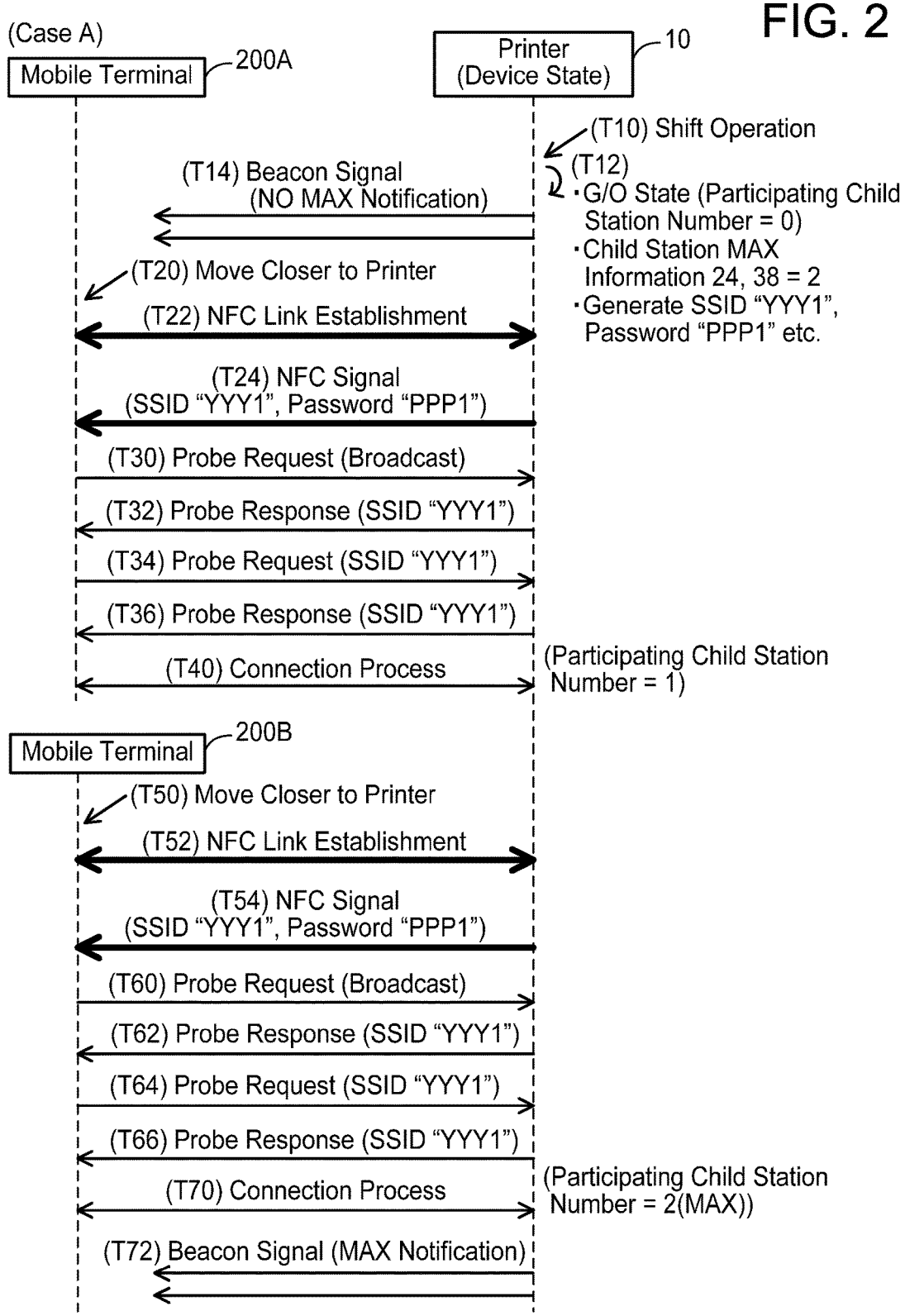
FIG. 2 shows a sequence diagram of a case A in which a Wi-Fi connection is established between a printer 10 and a mobile terminal 200A and 200B.

(Case A; FIG. 2)

In a case A, a Wi-Fi connection is firstly established between the printer 10 and the mobile terminal 200A, and then a Wi-Fi connection is established between the printer 10 and the mobile terminal 200B. In an initial state of the case A, the printer 10 is operating in the device state.

Upon a shift operation being executed in the operation unit 12 of the printer 10 by the user in T10, the printer 10 shifts from the device state to the G/O state in T12. At this stage, a participating child station number, which is the number of child stations participating in the WFDNW in which the printer 10 operates as a parent station (i.e., G/O), is zero. In T12, the printer 10 further sets "2" as the child station MAX information 24, 38. Specifically, the CPU 32 of the printer 10 sets "2" as the child station MAX information 38 in the memory 34, and further supplies an instruction indicating "2" as the upper limit child station number to the Wi-Fi I/F 20. Thereby, according to the instruction, the Wi-Fi I/F 20 stores "2" as the child station MAX information 24. In T12, the printer 10 further generates wireless setting information (i.e., an SSID (abbreviation of Service Set Identifier) "YYY1", a password "PPP1", etc.) to be used in the WFDNW.

In T14, the Wi-Fi I/F 20 of the printer 10 starts to periodically send a beacon signal. The beacon signal is a signal for informing devices around the printer 10 of the presence of a parent station in a case where the printer 10 is operating as the parent station. At this stage, since the participating child station number is zero and the child station MAX information 24 is "2", the Wi-Fi I/F 20 determines that the participating child station number is less than the upper limit child station number. In this case, the Wi-Fi I/F 20 sends a beacon signal not including a MAX notification which indicates that the participating child station number is equal to the upper limit child station number.

Upon the user moving the mobile terminal 200A closer to the printer 10 in T20, an NFC link is established between the NFC I/F 28 of the printer 10 and an NFC I/F (not shown) of the mobile terminal 200A in T22.

By using the established NFC link, in T24, the printer 10 sends an NFC signal including the SSID "YYY1" and the password "PPP1" to the mobile terminal 200A.

Upon receiving the NFC signal from the printer 10 in T24, the mobile terminal 200A sends a Probe request by broadcast in T30. The Probe request includes an area in which an SSID is to be written (called "SSID area" below). The SSID area of the Probe request sent in T30 does not include the SSID "YYY1".

Upon receiving the Probe request from the mobile terminal 200A in T30, the printer 10 sends a Probe response including the SSID "YYY1" to the mobile terminal 200A in T32.

Upon receiving the Probe response from the printer 10 in T32, the mobile terminal 200A determines that the SSID "YYY1" included in the Probe response is identical to the SSID "YYY1" included in the received NFC signal, and recognizes that the printer 10 which is the sender of the Probe response is a connection target. Then, in T34, the mobile terminal 200A sends a Probe request including the SSID area in which the SSID "YYY1" is written, to the printer 10.

Upon receiving the Probe request from the mobile terminal 200A in T34, the printer 10 sends a Probe response including the SSID "YYY1" to the mobile terminal 200A in T36.

In T40, a connection process is executed between the printer 10 and the mobile terminal 200A. Specifically, the mobile terminal 200A receives the wireless setting information including the SSID "YYY1" and the password "PPP1" from the printer 10. Then, a communication for authentication (e.g., 4-way Handshake, etc.) using the wireless setting information is executed between the printer 10 and the mobile terminal 200A, as a result of which a Wi-Fi connection is established between the printer 10 and the mobile terminal 200A. Thereby, the printer 10 causes the mobile terminal 200A to participate as a child station in the WFDNW. As a result, the participating child station number of the WFDNW becomes "1".

Thereafter, in T50, the user moves the mobile terminal 200B closer to the printer 10. T52 to T70 are the same as T22 to T40. Thereby, a Wi-Fi connection is established between the printer 10 and the mobile terminal 200B, and the printer 10 causes the mobile terminal 200B to participate as a child station in the WFDNW. As a result, the participating child station number of the WFDNW becomes "2". Consequently, since the participating child station number is "2" and the child station MAX information 24 is "2", the Wi-Fi I/F 20 of the printer 10 determines that the participating child station number is equal to the upper limit child station number. In this case, in T72, the Wi-Fi I/F 20 starts to send a beacon signal including the MAX notification, instead of the beacon signal not including the MAX notification.

Figure 3:
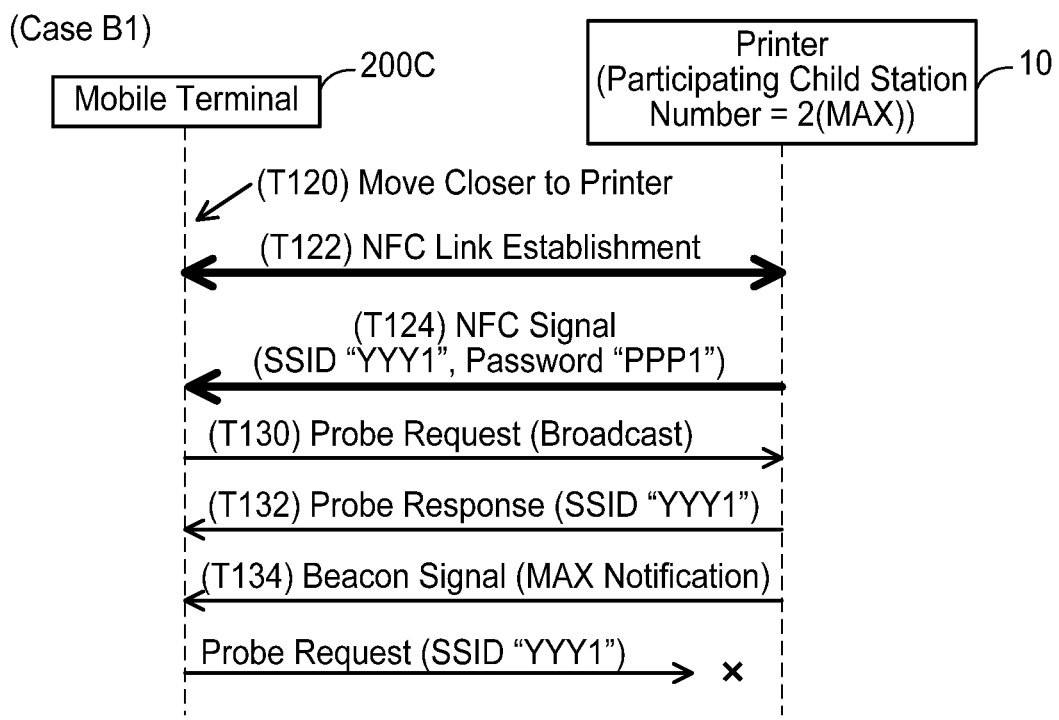
FIG. 3 shows a sequence diagram of a case B1 in which a Wi-Fi connection is not established between the printer 10 and a mobile terminal 200C.

(Case B1; FIG. 3)

Next, a case B1, which is a continuation of the case A of FIG. 2, will be described with reference to FIG. 3. In the case B1, the mobile terminal 200C, which does not include the app 140, attempts to establish a Wi-Fi connection with the printer 10. However, since the participating child station number of the WFDNW is equal to the upper limit child station number (i.e., "2"), the mobile terminal 200C cannot establish a Wi-Fi connection with the printer 10.

T120 to T132 are the same as T20 to T32 of FIG. 2. In T134, the mobile terminal 200C receives the beacon signal including the MAX notification from the printer 10. In this case, the mobile terminal 200C determines it is impossible to establish a Wi-Fi connection with the printer 10 and does not send a Probe request including the SSID "YYY1" to the printer 10 (see T34, T64 of FIG. 2). Therefore, the connection process is not executed between the printer 10 and the mobile terminal 200C (see T40, T70 of FIG. 2), as a result of which the printer 10 does not cause the mobile terminal 200C to participate as a child station in the WFDNW.

Figure 4:
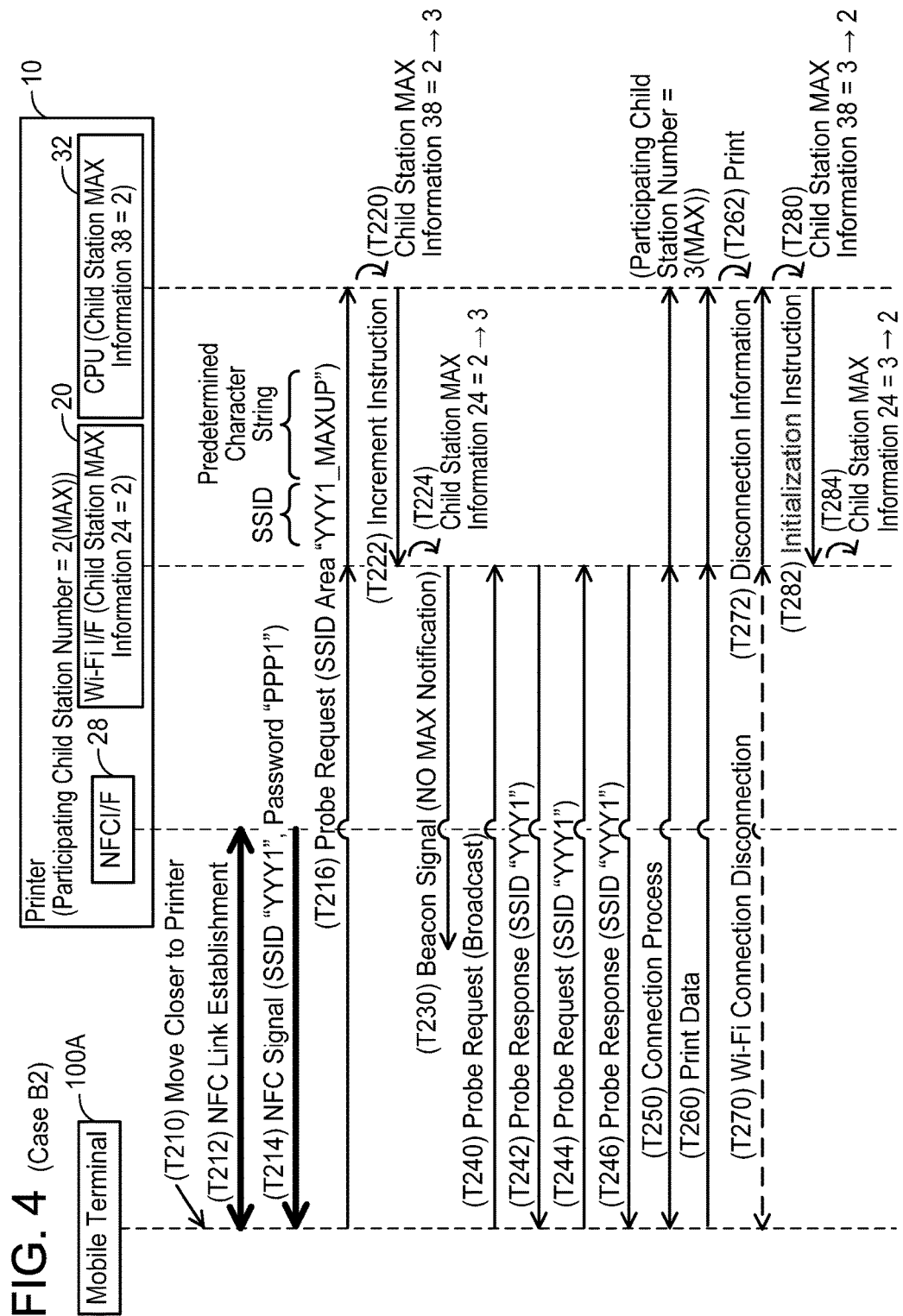
FIG. 4 shows a sequence diagram of a case B2 in which a Wi-Fi connection is established between the printer 10 and a mobile terminal 100A.

(Case B2; FIG. 4)

Next, a case B2, which is a continuation of the case A of FIG. 2, will be described with reference to FIG. 4. In the case B2, the mobile terminal 100A, which includes the app 140, attempts to establish a Wi-Fi connection with the printer 10. It should be noted that, below, for convenience of explanation, a subject of processes executed by the mobile terminal 100A according to the app 140 and a subject of processes executed by the mobile terminal 100A according to the OS software 136 will be referred to as "app 140" and "OS 136", respectively.

T210 to T214 are the same as T20 to T24 of FIG. 2. Upon receiving the SSID "YYY1" and the password "PPP1" from the printer 10 in T214, the app 140 of the mobile terminal 100A supplies a first instruction to the OS 136. The first instruction is a command for instructing the OS 136 to send a Probe request including an SSID area in which the SSID "YYY1" received in T214 and a predetermined character string "MAXUP" are written. The predetermined character string "MAXUP" is a character string for causing the printer 10 to increase the upper limit child station number. Upon acquiring the first instruction from the app 140, the OS 136 supplies a second instruction to the Wi-Fi I/F 120. The second instruction is a command for instructing the Wi-Fi I/F 120 to send a Probe request including an SSID area in which a character string "YYY1_MAXUP" is written. Upon acquiring the second instruction from the OS 136, in T216, the Wi-Fi I/F 120 sends the Probe request including the SSID area in which the character string "YYY1_MAXUP" is written, to the printer 10.

Even when the Probe request is received from the mobile terminal 100A in T216, since the SSID area in the Probe request includes the character string "YYY1_MAXUP" that is different from the SSID "YYY1" of the WFDNW, the Wi-Fi I/F 20 of the printer 10 does not send a Probe response for the Probe request to the mobile terminal 100A. Further, upon receiving the Probe request from the mobile terminal 100A in T216, the CPU 32 of the printer 10 determines that the predetermined character string "MAXUP" is written in the SSID area in the Probe request. In this case, in T220, the CPU 32 sets "3" instead of "2" as the child station MAX information 38 in the memory 34. Then, in T222, the CPU 32 supplies an increment instruction for incrementing the child station MAX information 24, to the Wi-Fi I/F 20.

Upon acquiring the increment instruction from the CPU 32 in T222, the Wi-Fi I/F 20 of the printer 10 sets "3" instead of "2" as the child station MAX information 24 in the memory 22 in T224. Thereby, the participating child station number (i.e., "2") becomes less than the upper limit child station number (i.e., "3"). As a result, in T230, the Wi-Fi I/F 20 starts to send the beacon signal not including the MAX notification, instead of the beacon signal including the MAX notification. Thereby, it is possible to prevent interruption in processes for the mobile terminal 100A to establish a Wi-Fi connection with the printer 10 (e.g., processes from T240 onward, to be described later) due to the mobile terminal 100A receiving the beacon signal including the MAX notification.

Then, in T240, the app 140 of the mobile terminal 100A supplies a connection request instruction to the OS 136. The connection request instruction includes a command for instructing the OS 136 to send a broadcast Probe request, a command for instructing the OS 136 to send a Probe request including the SSID "YYY1", and a command for instructing the OS 136 to execute the connection process. In this case, the OS 136 supplies these commands to the Wi-Fi I/F 120. As a result, T242 to T250 are executed in the same manner as T32 to T40 of FIG. 2, and a Wi-Fi connection is established between the printer 10 and the mobile terminal 100A.

By executing T242 to T250, the printer 10 causes the mobile terminal 100A to participate as a child station in the WFDNW. As a result, the participating child station number of the WFDNW becomes "3". Consequently, the Wi-Fi I/F 20 determines that the participating child station number is equal to the upper limit child station number, and starts to send the beacon signal including the MAX notification instead of the beacon signal not including the MAX notification, which is not shown.

In a case where a Wi-Fi connection with the printer 10 is established in T250, the app 140 of the mobile terminal 100A sends, in T260, print data representing an image of a print target to the printer 10 by using the Wi-Fi connection with the printer 10 (i.e., by using the WFDNW).

Upon receiving the print data from the mobile terminal 100A in T260, the CPU 32 of the printer 10 supplies the print data to the print executing unit 16 and causes the print executing unit 16 to execute printing of the image represented by the print data in T262.

Upon the communication of the print data between the printer 10 and the mobile terminal 100A being completed, the Wi-Fi connection between the printer 10 and the mobile terminal 100A is disconnected in T270. For example, the printer 10 disconnects the Wi-Fi connection by sending a disconnection response to the mobile terminal 100A in response to receiving a disconnection request from the mobile terminal 100A. As a result, the participating child station number of the WFDNW becomes "2".

Upon the Wi-Fi connection with the mobile terminal 100A being disconnected, the Wi-Fi I/F 20 of the printer 10 supplies disconnection information indicating that the Wi-Fi connection with the mobile terminal 100A has been disconnected, to the CPU 32 in T272. Upon acquiring the disconnection information from the Wi-Fi I/F 20, the CPU 32 sets "2" instead of "3" as the child station MAX information 38 in the memory 34 in T280, and supplies an initialization instruction to the Wi-Fi I/F 20 in T282. The initialization instruction is a command for instructing the Wi-Fi I/F 20 to return the child station MAX information 24 to the initial value "2". Upon acquiring the initialization instruction from the CPU 32, the Wi-Fi I/F 20 sets "2" instead of "3" as the child station MAX information 24 in the memory 22 in T284. As a result, the participating child station number of the WFDNW becomes equal to the upper limit child station number.

(Effect of Case A to Case B2)

The mobile terminal 100A including the app 140 is a device with a higher necessity of participating in the WFDNW in which the printer 10 operates as the parent station, compared to the mobile terminal 200A and the like which do not include the app 140. This is because the app 140 is an application for sending print data to the printer 10. Therefore, in the present embodiment, the printer 10 firstly sets the upper limit child station number to "2", which is less than the capacity upper limit number "3" (T12 of FIG. 2), to enable the mobile terminal 100A including the app 140 to participate as a child station in the WFDNW even under a situation where the participating child station number of the WFDNW is equal to the upper limit child station number.

In a case where the printer 10 receives a Probe request not including the predetermined character string "MAXUP" from the mobile terminal 200C under a situation where "2" is set as the upper limit child station number and the participating child station number of the WFDNW is "2" (T130 of FIG. 3), the printer 10 maintains "2" as the upper limit child station number and does not establish a Wi-Fi connection with the mobile terminal 200C. Thereby, the state is maintained in which the mobile terminal 100A including the app 140 can be caused to participate as a child station in the WFDNW.

On the other hand, in a case where the printer 10 receives a Probe request including the predetermined character string "MAXUP" from the mobile terminal 100A under the situation where "2" is set as the upper limit child station number and the participating child station number is "2" (T216 of FIG. 4), the printer 10 sets "3" instead of "2" as the upper limit child station number (T220, T224). Then, the printer 10 establishes a Wi-Fi connection with the mobile terminal 100A and causes the mobile terminal 100A to participate as a child station in the WFDNW (T250). As such, even under the situation where the participating child station number is equal to the upper limit child station number (i.e., under the initial state of FIG. 4), the printer 10 can cause the mobile terminal 100A including the app 140 to participate as a child station in the WFDNW. Consequently, the printer 10 can receive print data from the mobile terminal 100A and appropriately execute the printing (T262).

Further, when the Wi-Fi connection with the mobile terminal 100A is disconnected, the printer 10 sets "2" instead of "3" as the upper limit child station number (i.e., returns to "2"; T280 to T284). Thereby, since "2", which is less than the capacity upper limit number "3", is set as the upper limit child station number, the mobile terminal 100A can again be caused to participate as a child station in the WFDNW or the mobile terminal 100B including the app 140 can be caused to participate as a child station in the WFDNW even under a situation where the participating child station number of the WFDNW is equal to the upper limit child station number (i.e., under the situation after T284 of FIG. 4).

Further, in a case where the mobile terminal 100A including the app 140 receives the SSID "YYY1" of the WFDNW from the printer 10 via the NFC I/F 122 (T214), the mobile terminal 100A sends the Probe request including the SSID "YYY1" and the predetermined character string "MAXUP" to the printer 10 via the Wi-Fi I/F 120 (T216). Thereby, "3" instead of "2" can be set in the printer 10 as the upper limit child station number. As a result, the mobile terminal 100A can participate as a child station in the WFDNW even under the situation where the participating child station number is equal to the upper limit child station number (i.e., under the situation of the initial state of FIG. 4).

Figure 5:
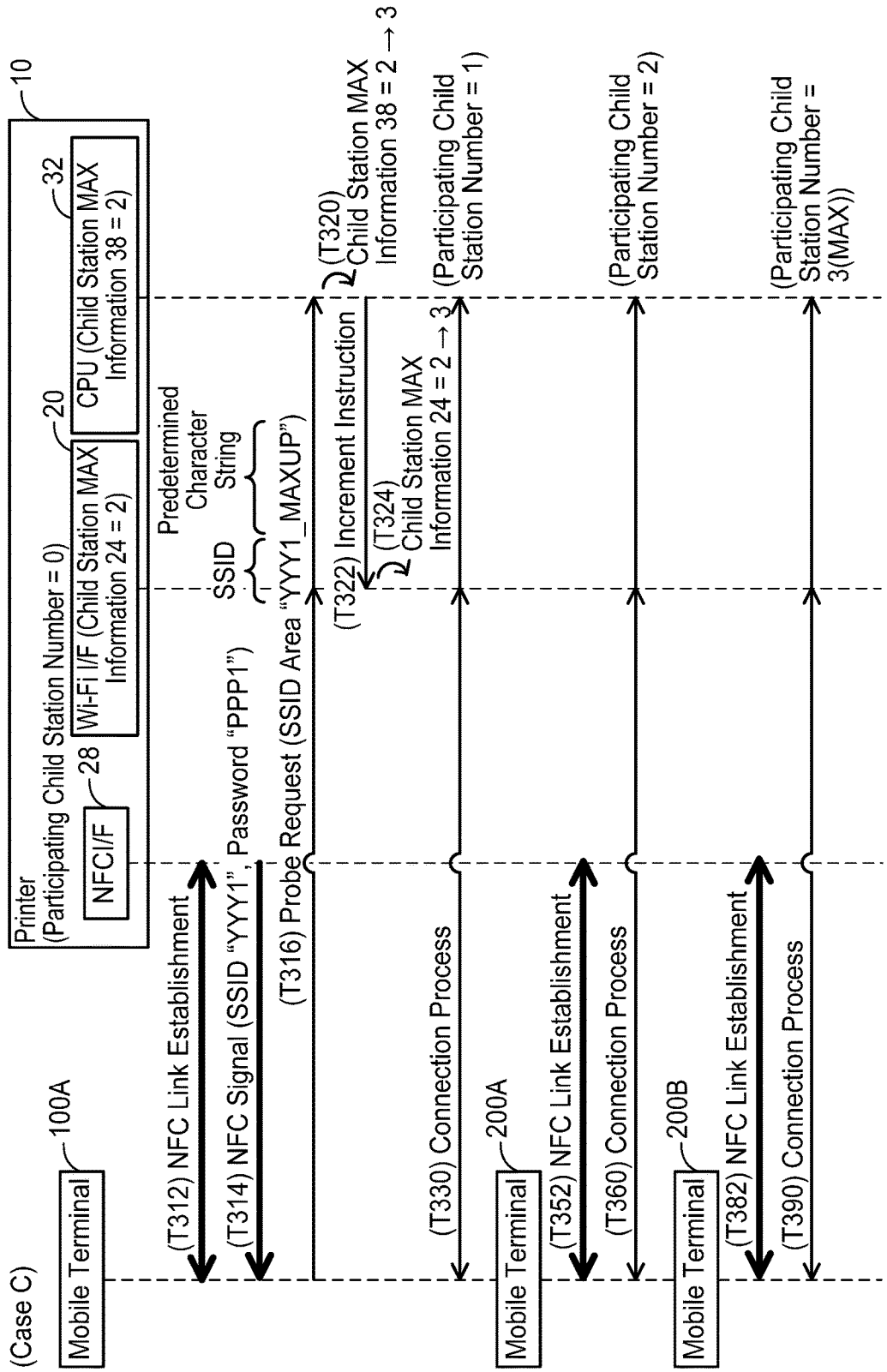
FIG. 5 shows a sequence diagram of a case C in which a Wi-Fi connection is established between the printer 10 and the mobile terminal 100A.

(Case C; FIG. 5)

Next, a case C, in which a Wi-Fi connection is established between the printer 10 and the mobile terminal 100A before Wi-Fi connections between the printer 10 and the mobile terminals 200A, 200B are established, will be described with reference to FIG. 5. In an initial state of the case C, the printer 10 is operating in the G/O state, and the participating child station number of the WFDNW is zero (i.e., T10 and T12 of FIG. 2 have been executed).

Upon the user moving the mobile terminal 100A closer to the printer 10, an NFC link is established between the printer 10 and the mobile terminal 100A in T312. T314 to T324 are the same as T214 to T224 of FIG. 4. That is, even under a situation where the participating child station number of the WFDNW (i.e., zero) is less than the upper limit child station number (i.e., "2"), in a case of receiving the Probe request including the character string "YYY1_MAXUP", the printer 10 sets "3" instead of "2" as the child station MAX information 24, 38 (i.e., as the upper limit child station number) (T320, T324). Then, although not shown, processes same as T240 to T246 of FIG. 4 are executed, and then, in T330, the connection process is executed between the printer 10 and the mobile terminal 100A. Thereby, a Wi-Fi connection is established between the printer 10 and the mobile terminal 100A, and the mobile terminal 100A participates as a child station in the WFDNW. As a result, the participating child station number of the WFDNW becomes "1".

T352 and T360 are the same as T22 and T40 of FIG. 2. Although not shown, processes same as T24 to T36 of FIG. 2 are also executed. Thereby, a Wi-Fi connection is established between the printer 10 and the mobile terminal 200A, and the mobile terminal 200A participates as a child station in the WFDNW. As a result, the participating child station number of the WFDNW becomes "2".

T382 and T390 are same as T52 and T70 of FIG. 2. Although not shown, processes same as T54 to T66 of FIG. 2 are also executed. Thereby, a Wi-Fi connection is established between the printer 10 and the mobile terminal 200B, and the mobile terminal 200B participates as a child station in the WFDNW. As a result, the participating child station number of the WFDNW becomes "3", and the participating child station number becomes equal to the upper limit child station number.

(Effect of Case C)

As described above, in a case where the printer 10 receives a Probe request including the predetermined character string "MAXUP" from the mobile terminal 100A under a situation where "2" is set as the upper limit child station number and the participating child station number is less than the upper limit child station number (T316 of FIG. 5), the printer 10 sets "3" instead of "2" as the upper limit child station number (T320 to T324). Therefore, after having caused the mobile terminal 100A to participate as a child station in the WFDNW, the printer 10 can cause each of the mobile terminal 200A and the mobile terminal 200B to participate as a child station in the WFDNW (T360, T390). As such, regardless of which of the mobile terminal 100A including the app 140 and the mobile terminals 200A, 200B not including the app 140 participates first in the WFDNW (i.e., regardless of under the situations of FIG. 2 and FIG. 4, and under the situation of FIG. 5), the printer 10 can appropriately cause all of the three mobile terminals 100A, 200A, 200B, including the mobile terminal 100A including the app 140, to participate in the WFDNW.

Figure 6:
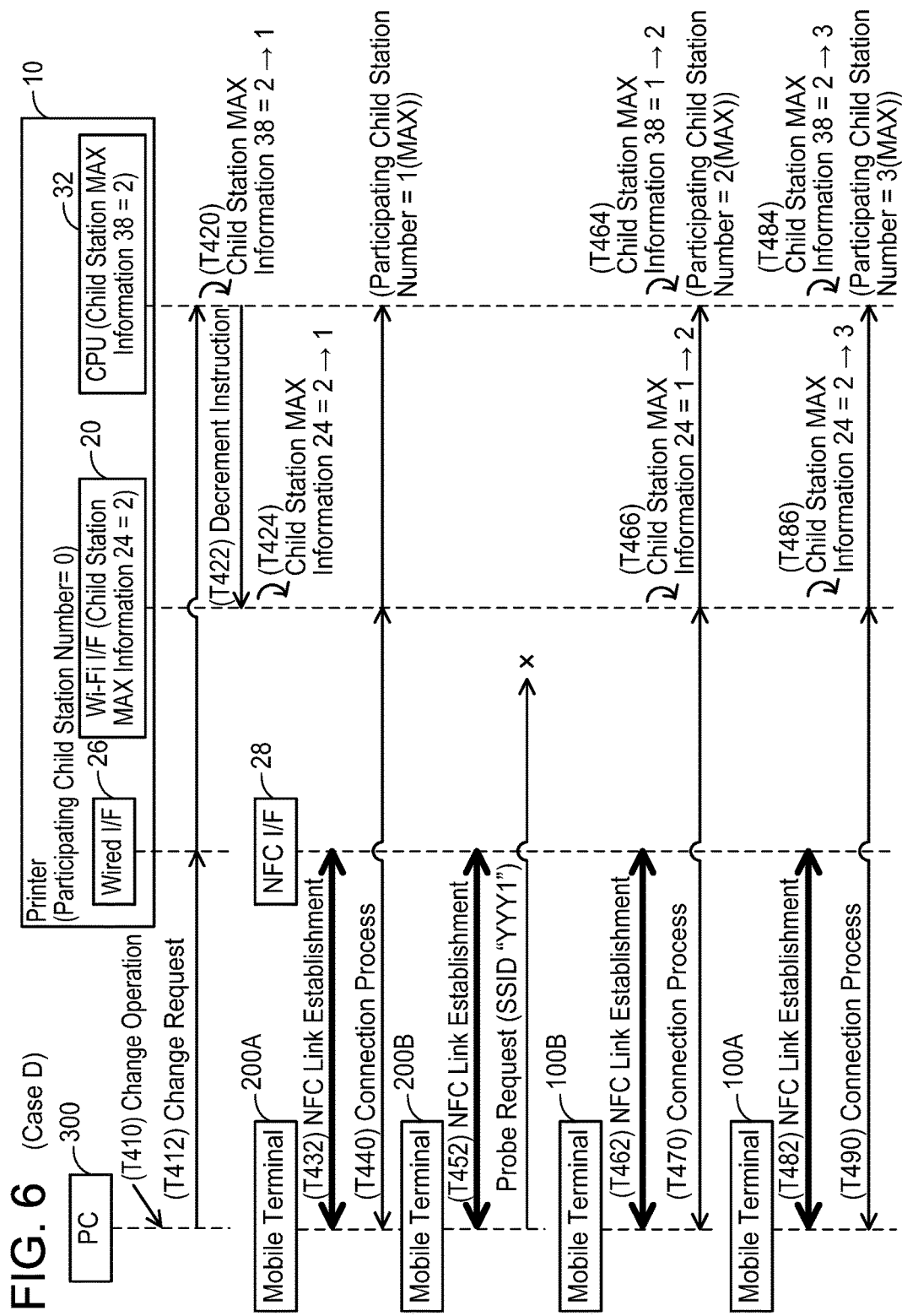
FIG. 6 shows a sequence diagram of a case D in which child station MAX information of the printer 10 is changed.

(Case D; FIG. 6)

Next, a case D, in which the upper limit child station number of the printer 10 is changed according to a change request from the PC 300, will be described with reference to FIG. 6. In an initial state of the case D, the printer 10 is operating in the G/O state, and the participating child station number of the WFDNW is zero (i.e., T10 and T12 of FIG. 2 have been executed).

Upon a change operation being executed in an operation unit of the PC 300 by, for example, an administrator of the printer 10 in T410, the PC 300 sends a change request to the printer 10 in T412. The change operation is an operation for changing the upper limit child station number within a range that does not exceed the capacity upper limit number (i.e., "3") of the printer 10. In the present case, the change operation is an operation for decreasing the upper limit child station number from "2" to "1". It should be noted that the administrator can also execute the change operation for increasing the upper limit child station number.

Upon receiving the change request from the PC 300 via the wired I/F 26 in T412, the CPU 32 of the printer 10 sets "1" instead of "2" as the child station MAX information 38 in T420. Then, in T422, the CPU 32 supplies, to the Wi-Fi I/F 20, a decrement instruction for instructing to change the child station MAX information 24. Upon acquiring the decrement instruction in T422, the Wi-Fi I/F 20 sets "1" instead of "2" as the child station MAX information 24 in T424. It should be noted that, in the present embodiment, the example is described in which the change request is sent to the printer 10 from the PC 300, however, in a variant, the printer 10 may accept the change request by the administrator operating the operation unit 12 of the printer 10.

T432 and T440 are respectively the same as T352 and T360 of FIG. 5. Thereby, a Wi-Fi connection is established between the printer 10 and the mobile terminal 200A, and the mobile terminal 200A participates as a child station in the WFDNW. As a result, the participating child station number of the WFDNW becomes "1", and the participating child station number becomes equal to the upper limit child station number.

T452 is the same as T382 of FIG. 5. In this case, processes same as T130 to T134 of FIG. 3 are executed. However, since the participating child station number of the printer 10 is equal to the upper limit child station number, the beacon signal including the MAX notification (see T72 of FIG. 2) is sent from the printer 10. Due to this, the mobile terminal 200B does not send a Probe request including the SSID "YYY1" to the printer 10. As a result, a Wi-Fi connection is not established between the mobile terminal 200B and the printer 10.

T462 is the same as T312 of FIG. 5. In this case, although not shown, the mobile terminal 100B including the app 140 sends a Probe request including the character string "YYY1_MAXUP" to the printer 10, as in T316 of FIG. 5. In this case, in T464, the CPU 32 of the printer 10 sets "2" instead of "1" as the child station MAX information 38, and supplies the increment instruction to the Wi-Fi 20. As a result, in T466, the Wi-Fi I/F 20 sets "2" instead of "1" as the child station MAX information 24. Thereby, since the participating child station number of the printer 10 becomes less than the upper limit child station number, the connection process is executed between the printer 10 and the mobile terminal 100B in T470. As a result, a Wi-Fi connection is established between the printer 10 and the mobile terminal 100B, and the mobile terminal 100B participates as a child station in the WFDNW. Since the participating child station number of the WFDNW becomes "2", the participating child station number becomes equal to the upper limit child station number.

T482 to T486 are the same as T462 to T466, except that "3" instead of "2" is set as the upper limit child station number according to a request from the mobile terminal 100A including the app 140. Thereby, since the participating child station number of the printer 10 becomes less than the upper limit child station number, the connection process is executed between the printer 10 and the mobile terminal 100A in T490. As a result, a Wi-Fi connection is established between the printer 10 and the mobile terminal 100A, and the mobile terminal 100A participates as a child station in the WFDNW. Since the participating child station number of the WFDNW becomes "3", the participating child station number becomes equal to the upper limit child station number.

(Effect of Case D)

As described above, the printer 10 can change the upper limit child station number according to the change request from the administrator. In particular, since the printer 10 can decrease the upper limit child station number (T420), the printer 10 can appropriately cause the plurality of mobile terminals 100A, 100B including the app 140 to participate in the WFDNW. For example, the administrator can change the upper limit child station number of the printer 10 according to the environment in which the printer 10 is installed (e.g., a ratio between a number of users of mobile terminals including the app 140 and a number of users of mobile terminals not including the app 140, etc.).

Here, a comparative embodiment is assumed in which, in T464 and T466 of FIG. 6, the printer 10 changes the upper limit child station number not from "1" to "2", but from "1" to "3". According to the comparative embodiment, since the participating child station number "2" is less than the upper limit child station number "3" at the stage of the mobile terminal 100B participating in the WFDNW, a mobile terminal (e.g., 200A) not including the app 140 can participate in the WFDNW. As a result, the participating child station number becomes equal to the upper limit child station number, which is the capacity upper limit number "3", and after this, the mobile terminal 100A including the app 140 cannot participate in the WFDNW. On the other hand, according to the present embodiment, the printer 10 does not increase the upper limit child station number from "1" to "3" in T464 and T466, but increases the upper limit child station number from "1" to "2" only by one. Therefore, since the participating child station number "2" is equal to the upper limit child station number at the stage of the mobile terminal 100B participating in the WFDNW, it is possible to prevent a mobile terminal (e.g., 200A) not including the app 140 from participating in the WFDNW. As a result, the mobile terminal 100A including the app 140 can be appropriately caused to participate in the WFDNW.

(Correspondence Relationships)

The printer 10, the Wi-Fi I/F 20, and the NFC I/F 28 are an example of "communication device", "first wireless interface (of the communication device)", and "second wireless interface (of the communication device)", respectively. The memory 34 and the memory 22 are an example of "main memory" and "interface memory", respectively. The WFDNW is an example of "wireless network". The character string "MAXUP" is an example of "predetermined character string". "2", "3", and "1" set as the upper limit child station number are an example of "first value", "second value", and "third value", respectively. The mobile terminal 100A, the mobile terminals 200A to 200C, and the mobile terminal 100B are an example of "first external device", "second external device", and "third external device". The Wi-Fi I/F 120 and the NFC I/F 122 are an example of "first wireless interface (of the terminal device)" and "second wireless interface (of the terminal device)", respectively. The SSID "YYY1" of the WFDNW is an example of "target SSID".

The Probe request including the predetermined character string "MAXUP" of T216 in FIG. 4 and T316 in FIG. 5 is an example of "first signal". The Probe request (Broadcast) of T30, T60 in FIG. 2, and T130 in FIG. 3 is an example of "second signal". The Probe request including the predetermined character string "MAXUP" sent from the mobile terminal 100B is an example of "third signal". T22, T52 in FIG. 2, T122 in FIG. 3, and T212 in FIG. 4 are an example of "predetermined communication". T260 in FIG. 4 is an example of "specific communication".

T330 in FIG. 5 is an example of a process executed by "in a case where a first signal including a predetermined character string is received from a first external device under a situation where a participating child station number is less than an upper limit child station number, establish a wireless connection with the first external device". T40 and T70 in FIG. 2 are an example of a process executed by "establish a wireless connection with the second external device". T220 to T224 in FIG. 4 is an example of a process executed by "in a case where the first signal is received from the first external device under a situation where a first value is set as the upper limit child station number in the communication device and the participating child station number is equal to the first value, set a second value instead of the first value". T250 in FIG. 4 and T490 in FIG. 6 are an example of a process executed by "in a case where the second value is set instead of the first value as the upper limit child station number due to the first signal being received from the first external device under the situation where the participating child station number is equal to the first value, establish a wireless connection with the first external device". T214, T216, and T250 in FIG. 4 are examples of processes executed by "receive a target SSID", "send a predetermined signal", "supply an instruction", respectively.

Second Embodiment

The present embodiment differs from the first embodiment in that the printer 10 sends an NFC signal including the predetermined character string "MAXUP" to the mobile terminal.

For example, in the case A of FIG. 2, in T24, the printer 10 sends an NFC signal including the SSID "YYY1", the password "PPP1", and the predetermined character string "MAXUP", to the mobile terminal 200A. Since the mobile terminal 200A does not include the app 140, the mobile terminal 200A cannot interpret the predetermined character string "MAXUP". Consequently, the mobile terminal 200A ignores the predetermined character string "MAXUP", executes the processes of T30 to T40, and participates in the WFDNW.

Figure 7:
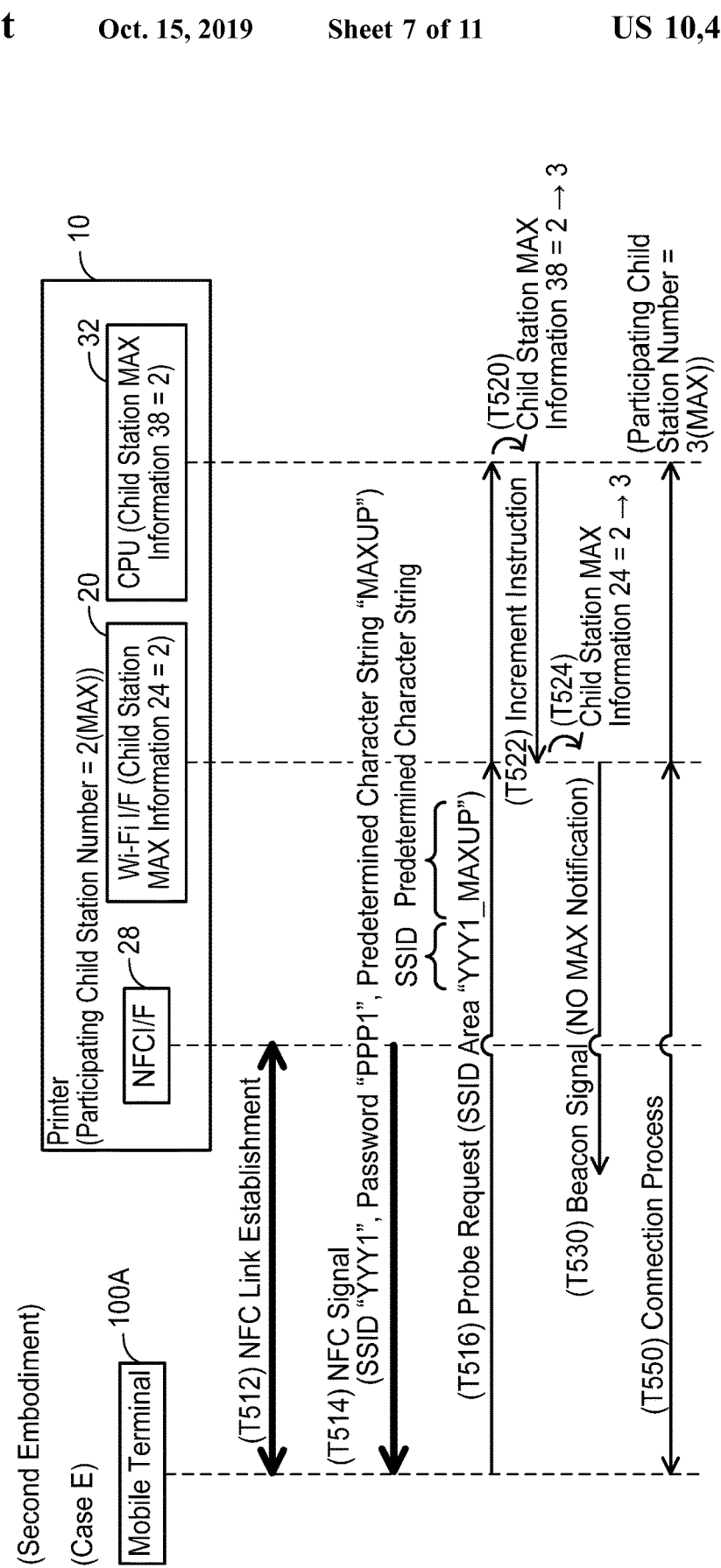
FIG. 7 shows a sequence diagram of a case E in which a Wi-Fi connection is established between the printer 10 and the mobile terminal 100A in a second embodiment.

(Case E; FIG. 7)

Next, a case E, in which the mobile terminal 100A including the app 140 establishes a Wi-Fi connection with the printer 10, will be described with reference to FIG. 7. The case E is a continuation of the case A. That is, in an initial state of the case E, the participating child station number of the WFDNW is equal to the upper limit child station number (i.e., "2").

Upon an NFC link being established between the printer 10 and the mobile terminal 100A in T512, the CPU 32 of the printer 10 sends an NFC signal including the SSID "YYY1", the password "PPP1", and the predetermined character string "MAXUP", to the mobile terminal 100A in T514.

Upon receiving the NFC signal in T514, the app 140 of the mobile terminal 100A recognizes that the NFC signal includes the predetermined character string "MAXUP". In this case, the app 140 supplies the first instruction to the OS 136 as in the first embodiment (see the description of T216 of FIG. 4). Thereby, in T516, the Wi-Fi I/F 120 sends a Probe request including an SSID area in which the character string "YYY1_MAXUP" is written, to the printer 10. The subsequent T520 to T530 are the same as T220 to T230 of FIG. 4. Then, although not shown, processes same as T240 to T246 of FIG. 4 are executed, and thereafter in T550, the connection process is executed between the printer 10 and the mobile terminal 100A. Thereby, a Wi-Fi connection is established between the mobile terminal 100A and the printer 10, and the mobile terminal 100A participates as a child station in the WFDNW. As a result, the participating child station number of the WFDNW becomes "3", and the participating child station number becomes equal to the upper limit child station number.

It should be noted that, in a case of receiving an NFC signal that includes an SSID and a password but does not include the predetermined character string "MAXUP" from a printer which is different from the printer 10 and is unable to change the upper limit child station number, the app 140 does not supply the first instruction to the OS 136. In this case, the mobile terminal 100A executes processes same as T240 to T246 of FIG. 4 and the process of T550, without sending the Probe request including the character string "YYY1_MAXUP" (see T516) to the printer 10.

Effect of Present Embodiment

In the present embodiment as well, the printer 10 sets "3" instead of "2" as the upper limit child station number (T520 to T524) in the case of receiving the Probe request including the predetermined character string "MAXUP" (T516) from the mobile terminal 100A. Therefore, the printer 10 can appropriately cause the mobile terminal 100A including the app 140 to participate as a child station in the WFDNW (T550) even under the situation where the participating child station number is equal to the upper limit child station number (i.e., under the situation of the initial state of FIG. 7).

(Correspondence Relationships)

T512 and T514 of FIG. 7 are an example of "predetermined communication". T520 to T524 of FIG. 7 are an example of a process executed by "in a case where the first signal is received from the first external device under a situation where a first value is set as the upper limit child station number in the communication device and the participating child station number is equal to the first value, set a second value instead of the first value". T550 of FIG. 7 is an example of a process executed by "in a case where the second value is set instead of the first value as the upper limit child station number due to the first signal being received from the first external device under the situation where the participating child station number is equal to the first value, establish a wireless connection with the first external device". T514, T516, and T550 of FIG. 7 are examples of processes executed by "receive a target SSID", "send a predetermined signal", "supply an instruction", respectively.

Variant of Second Embodiment

According to the second embodiment described above, in the NFC signal of T514, "YYY1" is written in the area in which the SSID is to be written and the predetermined character string "MAXUP" is written in an area in which information different from the SSID is to be written. In a variant of the second embodiment, the printer 10 may send, to the mobile terminal, an NFC signal in which the character string "YYY1_MAXUP" is written in the area in which the SSID is to be written. In this case, the NFC signal further includes a MAC address of the Wi-Fi I/F 20 of the printer 10.

For example, in the case A of FIG. 2, in T24, the printer 10 sends, to the mobile terminal 200A, an NFC signal including the character string "YYY1_MAXUP" written as the SSID, the password "PPP1", and the aforementioned MAC address. Since the mobile terminal 200A does not include the app 140, the mobile terminal 200A cannot recognize that the character string "YYY1_MAXUP" written as the SSID includes the predetermined character string "MAXUP". Then, the mobile terminal 200A executes the process of T30.

Upon receiving a Probe request from the mobile terminal 200A in T30, the printer 10 sends a Probe response that includes the SSID "YYY1" not including the predetermined character string "MAXUP" and the MAC address, to the mobile terminal 200A in T32. Upon receiving the Probe response from the printer 10 in T32, the mobile terminal 200A determines that the MAC address included in the Probe response is identical to the MAC address included in the received NFC signal and recognizes that the printer 10, which is the sender of the Probe response, is the connection target. Then, in T34, the mobile terminal 200A sends a Probe request that includes the SSID "YYY1" included in the received Probe response, to the printer 10. Then, processes same as T36 and T40 are executed. As a result, a Wi-Fi connection is established between the mobile terminal 200A and the printer 10, and the mobile terminal 200A participates as a child station in the WFDNW.

On the other hand, upon receiving the NFC signal from the printer 10 in T514 of the case E of FIG. 7, the mobile terminal 100A including the app 140 determines that the character string "YYY1_MAXUP" written as the SSID includes the predetermined character string "MAXUP", and in T516, sends a Probe request including the SSID area in which the character string "YYY1_MAXUP" is written, to the printer 10. Subsequent processes are the same as those of the second embodiment. In the present modification, communication of the NFC signal including "YYY1_MAXUP" written as the SSID is an example of "predetermined communication".

Third Embodiment

The present embodiment differs from the first embodiment and the second embodiment in that the mobile terminal 100A including the app 140 sends an NFC signal including the predetermined character string "MAXUP", instead of the Probe request including the predetermined character string "MAXUP", to the printer 10.

Figure 8:
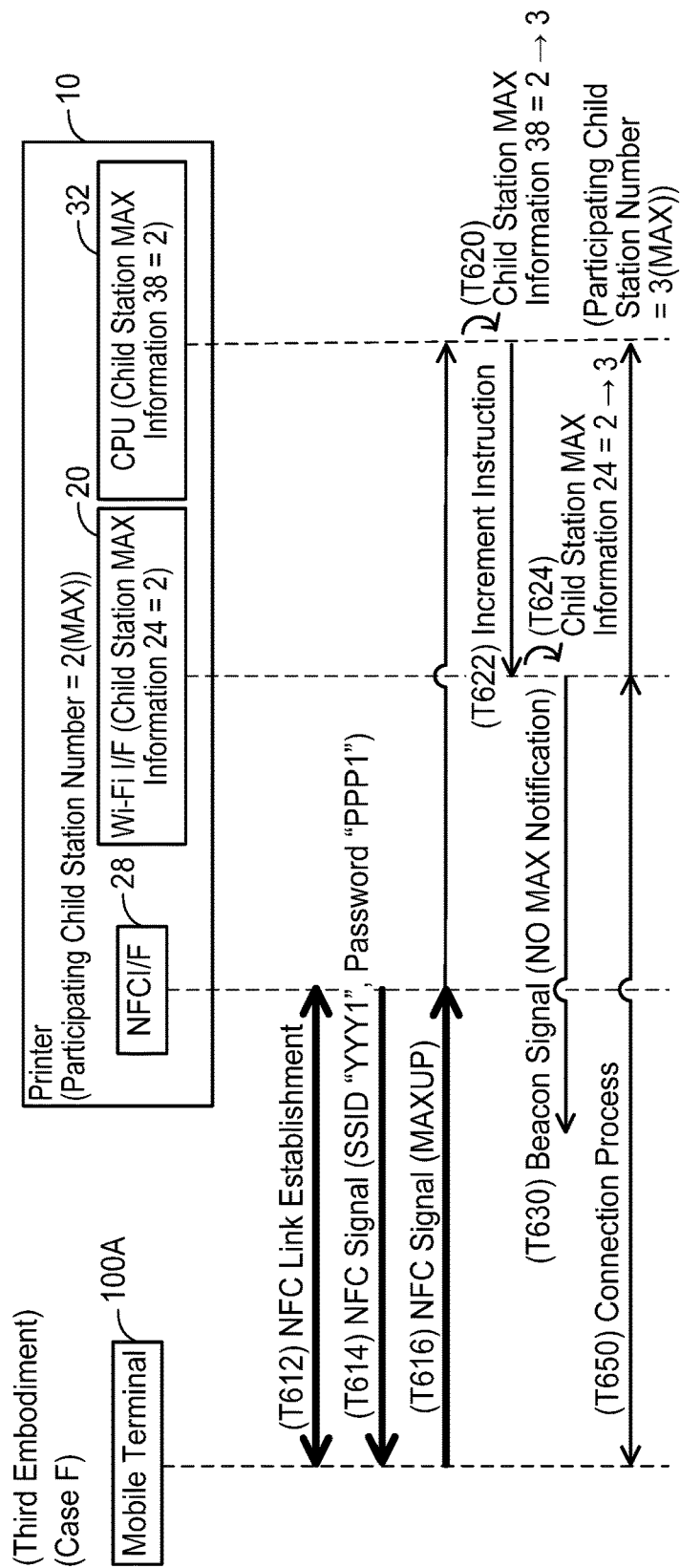
FIG. 8 shows a sequence diagram of a case F in which a Wi-Fi connection is established between the printer 10 and the mobile terminal 100A in a third embodiment.

(Case F; FIG. 8)

A case F, in which the mobile terminal 100A including the app 140 establishes a Wi-Fi connection with the printer 10, will be described with reference to FIG. 8. The case F is a continuation of the case A. That is, in an initial state of the case F, the participating child station number of the WFDNW is equal to the upper limit child station number (i.e., "2").

T612 and T614 are the same as T212 and T214 of FIG. 4. Upon receiving the NFC signal from the printer 10 in T614, the app 140 of the mobile terminal 100A sends an NFC signal including the predetermined character string "MAXUP" to the printer 10 in T616.

Upon receiving the NFC signal including the predetermined character string "MAXUP" from the mobile terminal 100A in T616, the CPU 32 of the printer 10 sets "3" instead of "2" as the upper limit child station number in T620 to T624 in the same manner as T220 to T224 of FIG. 4. T630 to T650 are the same as T230 to T250 of FIG. 4. Thereby, a Wi-Fi connection is established between the mobile terminal 100A and the printer 10, and the mobile terminal 100A participates as a child station in the WFDNW. As a result, the participating child station number of the WFDNW becomes "3", and the participating child station number becomes equal to the upper limit child station number.

Figure 9:
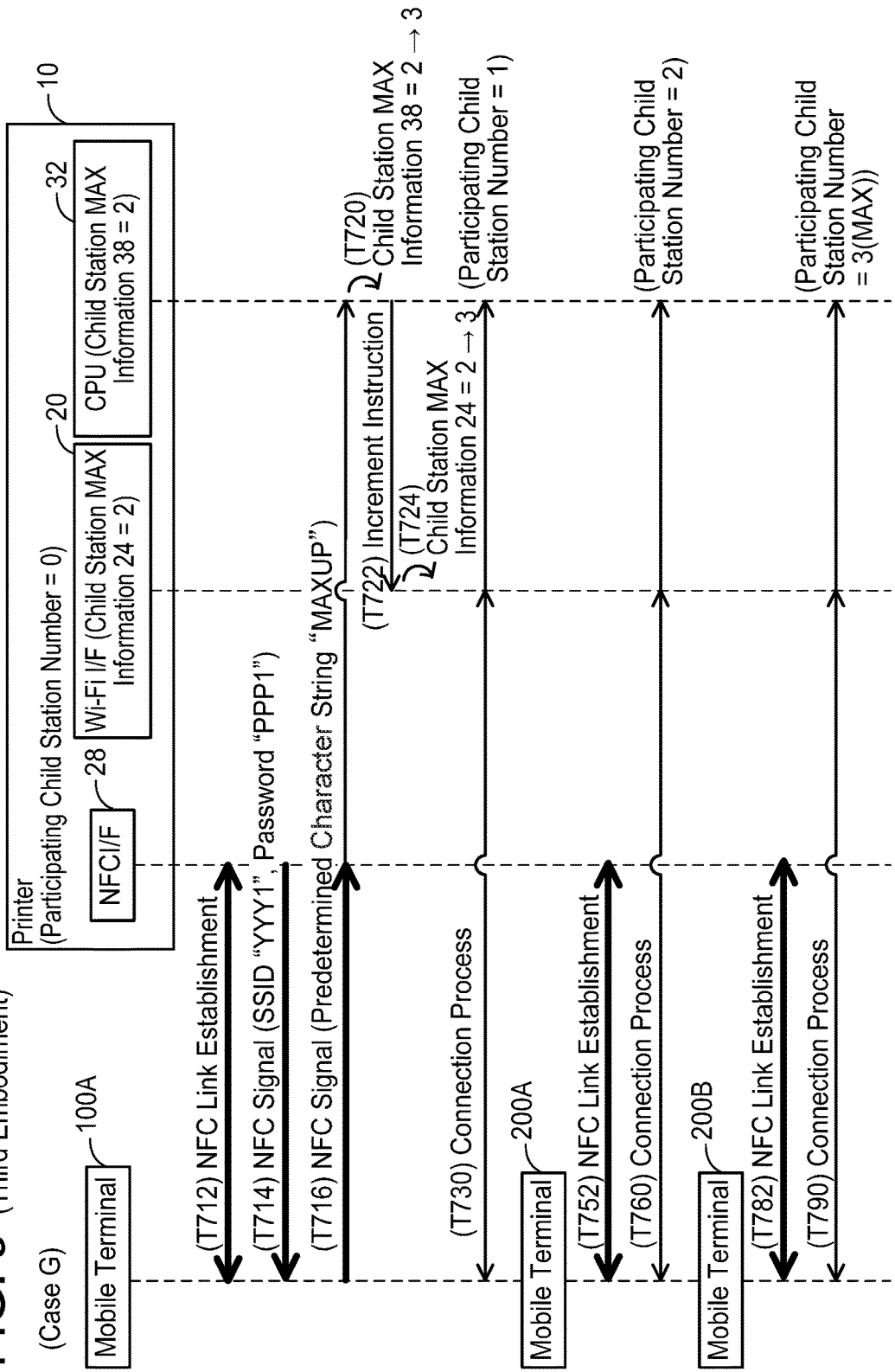
FIG. 9 shows a sequence diagram of a case G in which a Wi-Fi connection is established between the printer 10 and the mobile terminal 100A in the third embodiment.

(Case G; FIG. 9)

Next, a case G, in which a Wi-Fi connection is established between the printer 10 and the mobile terminal 100A before Wi-Fi connections are established between the printer 10 and the mobile terminals 200A, 200B, will be described with reference to FIG. 9. In an initial state of the case G, the printer 10 is operating in the G/O state, and the participating child station number of the WFDNW is zero.

T712 to T724 are the same as T612 to T624 of FIG. 8. That is, even under the situation where the participating child station number is less than the upper limit child station number (i.e., "2"), the printer 10 sets "3" instead of "2" as the upper limit child station number in the case of receiving the NFC signal including the predetermined character string "MAXUP". T730 is the same as T650. Thereby, a Wi-Fi connection is established between the mobile terminal 100A and the printer 10, and the mobile terminal 100A participates as a child station in the WFDNW. As a result, the participating child station number of the WFDNW becomes "1".

T752, T760, T782, and T790 are the same as T352, T360, T382, and T390 of FIG. 5, respectively. As a result of the mobile terminal 200A participating as a child station in the WFDNW, the participating child station number of the WFDNW becomes "2", and thereafter, as a result of the mobile terminal 200B participating as a child station in the WFDNW, the participating child station number of the WFDNW becomes "3".

Effect of Present Embodiment

According to the present embodiment, in the case of receiving the NFC signal including the predetermined character string "MAXUP" from the mobile terminal 100A (T616 of FIG. 8), the printer 10 sets "3" instead of "2" as the upper limit child station number (T620 to T624). Due to this, even under the situation where the participating child station number is equal to the upper limit child station number (i.e., under the situation of the initial state of FIG. 8), the printer 10 can appropriately cause the mobile terminal 100A including the app 140 to participate as a child station in the WFDNW (T650).

Further, in the case of receiving the NFC signal including the predetermined character string "MAXUP" from the mobile terminal 100A (T716 of FIG. 9) under the situation where "2" is set as the upper limit child station number and the participating child station number is less than the upper limit child station number (i.e., under the situation of the initial state of FIG. 9), the printer 10 sets "3" instead of "2" as the upper limit child station number (T720 to T724). Due to this, after having caused the mobile terminal 100A to participate as a child station in the WFDNW, the printer 10 can cause each of the mobile terminal 200A and the mobile terminal 200B to participate as a child station in the WFDNW (T760, T790). As such, regardless of which of the mobile terminal 100A including the app 140 and the mobile terminals 200A, 200B not including the app 140 first participate in the WFDNW, the printer 10 can appropriately cause all of the three mobile terminals 100A, 200A, 200B, including the mobile terminal 100A which includes the app 140, to participate in the WFDNW.

(Correspondence Relationships)

The NFC signal including the predetermined character string "MAXUP" of T616 in FIG. 8 is an example of "first signal". T730 of FIG. 9 is an example of a process executed by "in a case where a first signal including a predetermined character string is received from a first external device under a situation where a participating child station number is less than an upper limit child station number, establish a wireless connection with the first external device". T620 to T624 of FIG. 8 are an example of a process executed by "in a case where the first signal is received from the first external device under a situation where a first value is set as the upper limit child station number in the communication device and the participating child station number is equal to the first value, set a second value instead of the first value". T650 of FIG. 8 is an example of a process executed by "in a case where the second value is set instead of the first value as the upper limit child station number due to the first signal being received from the first external device under the situation where the participating child station number is equal to the first value, establish a wireless connection with the first external device".

Fourth Embodiment

The present embodiment differs from the first embodiment to the third embodiment in that "3" instead of "2" is set as the upper limit child station number of the WFDNW in response to establishment of an NFC link between the printer 10 and a mobile terminal, regardless of whether the mobile terminal includes the app 140 or not.

(Case H1; FIG. 10)

In a case H1, firstly, a Wi-Fi connection is established between the printer 10 and the mobile terminal 200A, and then a Wi-Fi connection is established between the printer 10 and the mobile terminal 200B. Then, the mobile terminal 100A attempts to establish a Wi-Fi connection with the printer 10. In an initial state of the case H1, the printer 10 is operating in the G/O state, and the participating child station number of the WFDNW is zero (i.e., T10 and T12 of FIG. 2 have been executed).

Upon a connection operation being executed by the user in an operation unit (not shown) of the mobile terminal 200A in T810, the mobile terminal 200A sends a Probe request by broadcast in T812.

Upon receiving the Probe request from the mobile terminal 200A in T812, the printer 10 sends a Probe response including the SSID "YYY1" to the mobile terminal 200A in T814.

Upon receiving the Probe response from the printer 10 in T814, the mobile terminal 200A displays a selection screen SS1 including the SSID "YYY1" included in the Probe response, on a display unit (not shown) of the mobile terminal 200A in T816. Since the mobile terminal 200A receives a Probe response also from a parent station (e.g., an access point) different from the printer 10, the selection screen SS1 includes not only the SSID "YYY1" of the printer 10, but also an SSID "YYY2" of the different parent station and the like. In T818, the mobile terminal 200A accepts selection of the SSID "YYY1" on the selection screen SS1, and further accepts input of the password "PPP1". T820 and T822 are the same as T34 and T36 of FIG. 2.

In T830, the connection process is executed between the printer 10 and the mobile terminal 200A. In the connection process of T830, the mobile terminal 200A sends the SSID "YYY1" and the password "PPP1" to the printer 10, and authentication of these pieces of information succeeds in the printer 10. Thereby, a Wi-Fi connection is established between the mobile terminal 200A and the printer 10, and the mobile terminal 200A participates as a child station in the WFDNW. As a result, the participating child station number of the WFDNW becomes "1".

Thereafter, upon a connection operation being executed by the user in an operation unit (not shown) of the mobile terminal 200B in T840, processes same as T812 to T822 are executed. Then, in T850, the connection process is executed between the printer 10 and the mobile terminal 200B. Thereby, a Wi-Fi connection is established between the mobile terminal 200B and the printer 10, and the mobile terminal 200B participates as a child station in the WFDNW. As a result, the participating child station number of the WFDNW becomes "2", and the participating child station number becomes equal to the upper limit child station number. T852 is the same as T72 of FIG. 2.

Thereafter, upon a connection operation being executed by the user in the operation unit 112 of the mobile terminal 100A in T860, processes same as T812 to T818 are executed. In a case where the SSID "YYY1" and the password "PPP1" are inputted by the user, even if the mobile terminal 100A receives a beacon signal including the MAX notification from the printer 10 in T870, the mobile terminal 100A sends a Probe request including an SSID area in which the SSID "YYY1" is written to the printer 10 in T880, and receives a Probe response from the printer 10 in T882. However, since the participating child station number of the WFDNW is equal to the upper limit child station number, the printer 10 does not establish a Wi-Fi connection with the mobile terminal 100A in the subsequent connection process. As a result, the mobile terminal 100A cannot participate in the WFDNW.

Figure 11:
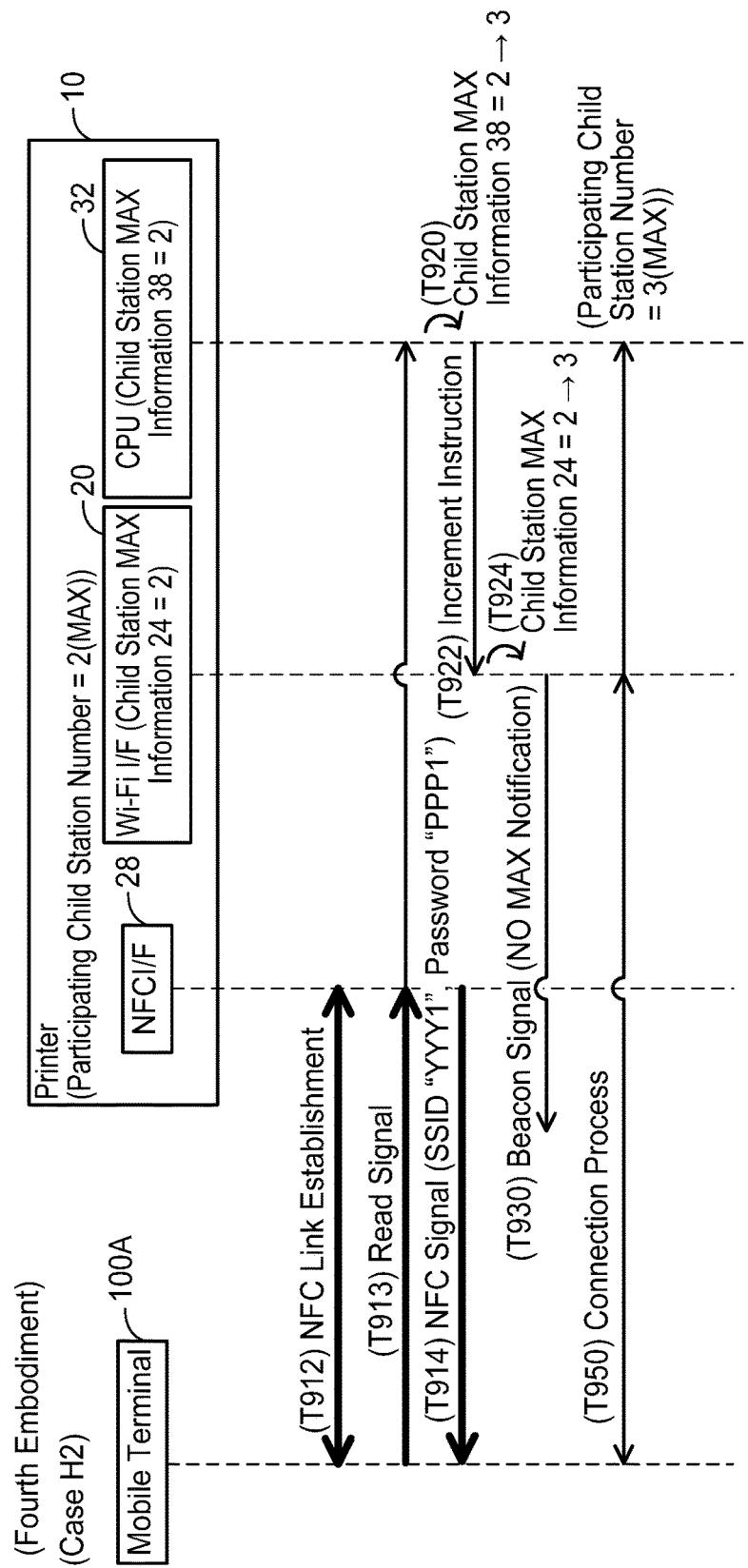
FIG. 11 shows a sequence diagram of a case H2 in which a Wi-Fi connection is established between the printer 10 and the mobile terminal 100A in the fourth embodiment.

(Case H2; FIG. 11)

Next, a case H2, which is a continuation of the case H1 of FIG. 10, will be described with reference to FIG. 11. In the case H2, a Wi-Fi connection is established between the mobile terminal 100A and the printer 10 in response to establishment of an NFC link between the mobile terminal 100A and the printer 10.

Upon the user moving the mobile terminal 100A closer to the printer 10 to establish an NFC link between the printer 10 and the mobile terminal 100A in T912, the mobile terminal 100A sends a Read signal to the printer 10 in T913 by using the established NFC link, and receives an NFC signal from the printer 10 in T914.

T920 to T930 are the same as T220 to T230 of FIG. 4. That is, in a case of receiving the Read signal from the mobile terminal 100A, the printer 10 sets "3" instead of "2" as the upper limit child station number (T920 to T924). Then, in T950, the connection process is executed between the printer 10 and the mobile terminal 100A. Thereby, a Wi-Fi connection is established between the printer 10 and the mobile terminal 100A, and the mobile terminal 100A participates as a child station in the WFDNW. Since the participating child station number of the WFDNW becomes "3", the participating child station number becomes equal to the upper limit child station number.

Effect of Present Embodiment

As in the case H2 of FIG. 11, under the situation where the mobile terminal 100A is moved closer to the printer 10 by the user to establish an NFC link between the mobile terminal 100A and the printer 10, there is a high possibility that the user wishes to acquire printed matter immediately from the printer 10 because the user is present near the printer 10. On the other hand, as in the case H1 of FIG. 10, under the situation where the connection operation is executed to the mobile terminal 100A by the user, there is a lower possibility that the user wishes to acquire printed matter immediately from the printer 10, as compared to the situation where the NFC link is established, because the user is probably not present near the printer 10. Therefore, in the present embodiment, in a case where the printer 10 receives a Probe request from the mobile terminal 100A via the Wi-Fi I/F 20 without receiving a Read signal via the NFC I/F 28 under a situation where "2" is set as the upper limit child station number and the participating child station number of the WFDNW is "2", the printer 10 maintains "2" as the upper limit child station number and does not establish a Wi-Fi connection with the mobile terminal 100A (case H1 of FIG. 10). On the other hand, in a case where the printer 10 receives a Read signal via the NFC I/F 28 (T913 of FIG. 11)

under the situation where "2" is set as the upper limit child station number and the participating child station number of the WFDNW is "2", the printer 10 sets "3" instead of "2" as the upper limit child station number (T920 to T924). Then, the printer 10 establishes a Wi-Fi connection with the mobile terminal 100A and causes the mobile terminal 100A to participate as a child station in the WFDNW (T950). As such, according to the present embodiment, under the situation where the participating child station number of the WFDNW is equal to the upper limit child station number, the printer 10 can appropriately cause the mobile terminal 100A, which is possessed by the user who is highly possibly wishing to acquire printed matter immediately from the printer 10, to participate as a child station in the WFDNW. That is, the printer 10 can appropriately cause the mobile terminal 100A with a high necessity of participating in the WFDNW to participate as a child station in the WFDNW.

(Correspondence Relationships)

The mobile terminal 200C is an example of "first external device" and "second external device". The Read signal of T913 of FIG. 11 is an example of "first signal". T812 of FIG. 10 is an example of "second signal". T920 to T924 of FIG. 11 are an example of "in a case where the first signal is received from the first external device under a situation where a first value is set as the upper limit child station number in the communication device and the participating child station number is equal to the first value, set a second value instead of the first value". T950 of FIG. 11 is an example of "in a case where the second value is set instead of the first value as the upper limit child station number due to the first signal being received from the first external device under the situation where the participating child station number is equal to the first value, establish a wireless connection with the first external device".

(Variant 1) "Communication device" is not limited to the printer 10, and may be a scanner, an MFP, a stationary PC, a server, a mobile terminal, or the like.

(Variant 2) The upper limit child station number may not be able to be changed by the change operation by the administrator. That is, the printer 10 may maintain "2" as the upper limit child station number even when the change request is received in T412 of FIG. 6. That is, "set a third value instead of the first value" may be omitted.

(Variant 3) In FIG. 6, in a case of receiving a Probe request including the predetermined character string "MAXUP" from the mobile terminal 100B after having set "1" instead of "2" as the upper limit child station number (T420, T424), the printer 10 may set "3" instead of "1" as the upper limit child station number. That is, "set the first value instead of the third value" may be omitted.

(Variant 4) In a case of receiving a Probe request including the predetermined character string "MAXUP" from the mobile terminal 100A (T316 of FIG. 5) under a situation where "2" is set as the upper limit child station number and the participating child station number is less than the upper limit child station number (the initial state of FIG. 5), the printer 10 may maintain "2" as the upper limit child station number. That is, T320 to T324 of FIG. 5 may be omitted. Further, in a case of receiving an NFC signal including the predetermined character string "MAXUP" from the mobile terminal 100A via the NFC I/F 28 (T716 of FIG. 9) under a situation where "2" is set as the upper limit child station number and the participating child station number is less than the upper limit child station number (the initial state of FIG. 9), the printer 10 may maintain "2" as the upper limit child station number. That is, T720 to T724 of FIG. 9 may be omitted. That is, "in a case where the first signal is received from the first external device under a situation where the first value is set as the upper limit child station number in the communication device and the participating child station number is less than the upper limit child station number set the second value instead of the first value" may be omitted.

(Variant 5) The printer 10 may not disconnect a Wi-Fi connection with the mobile terminal 100A in a case where "3" instead of "2" is set as the upper limit child station number and communication of print data by using the Wi-Fi connection has been completed (T260 of FIG. 4). That is, T270 to T284 of FIG. 4 may be omitted. That is, "disconnect the wireless connection with the first external device" and "set the first value instead of the second value" may be omitted.

(Variant 6) "Second wireless interface (of the communication device)" and "second wireless interface (of the terminal device)" may not be an I/F for executing an NFC communication, and may be, for example, an I/F for executing a wireless communication in accordance with another communication scheme such as BlueTooth (registered trademark), infrared, TransferJet, and the like.

What is claimed is:

1. A communication device comprising:
    a first wireless interface;
    a processor; and
    a main memory storing computer-readable instructions therein, the computer-readable instructions, when executed by the processor, causing the communication device to:
    in a case where a first signal including a predetermined character string is received from a first external device under a situation where a participating child station number is less than an upper limit child station number, establish a wireless connection with the first external device via the first wireless interface so as to cause the first external device to participate as a child station in a wireless network in which the communication device operates as a parent station, the participating child station number being a number of child stations currently participating in the wireless network, and the upper limit child station number being an upper limit of a number of child stations that are allowed to participate in the wireless network;
    in a case where a second signal not including the predetermined character string is received from a second external device under the situation where the participating child station number is less than the upper limit child station number, establish a wireless connection with the second external device via the first wireless interface so as to cause the second external device to participate as a child station in the wireless network;
    in a case where the first signal is received from the first external device under a situation where a first value is set as the upper limit child station number in the communication device and the participating child station number is equal to the first value, set a second value instead of the first value as the upper limit child station number in the communication device, the second value being greater than the first value, wherein in a case where the second signal is received from the second external device under the situation where the first value is set as the upper limit child station number in the communication device and the participating child station number is equal to the first value, the first value is maintained as the upper limit child station number; and in a case where the second value is set instead of the first value as the upper limit child station number due to the first signal being received from the first external device under the situation where the participating child station number is equal to the first value, establish a wireless connection with the first external device via the first wireless interface so as to cause the first external device to participate as a child station in the wireless network, wherein in a case where the first value is maintained as the upper limit child station number due to the second signal being received from the second external device under the situation where the participating child station number is equal to the first value, a wireless connection with the second external device is not established.

2. The communication device as in claim 1, further comprising:
a second wireless interface different from the first wireless interface, a maximum distance with which a wireless communication can be executed via the second wireless interface being shorter than a maximum distance with which a wireless communication can be executed via the first wireless interface,
wherein the first signal is received from the first external device via the first wireless interface after a predetermined communication with the first external device has been executed via the second wireless interface, and
the second signal is received from the second external device via the first wireless interface after a predetermined communication with the second external device has been executed via the second wireless interface.

3. The communication device as in claim 2, wherein the first signal is a first Probe request including an SSID (abbreviation of Service Set Identifier) area in which an SSID is to be described,
the SSID area includes a target SSID that is an SSID of the wireless network and the predetermined character string, and
the second signal is a second Probe request not including either of the target SSID or the predetermined character string.

4. The communication device as in claim 3, wherein the predetermined communication includes that the second wireless interface sends the target SSID and the predetermined character string.

5. The communication device as in claim 1, wherein the computer-readable instructions, when executed by the processor, further cause the communication device to:
in a case where a change request for requesting a change of the upper limit child station number is accepted from a user under the situation where the first value is set as the upper limit child station number in the communication device, set a third value instead of the first value as the upper limit child station number in the communication device, the third value being different from the first value.

6. The communication device as in claim 5, wherein the third value is less than the first value,
the computer-readable instructions, when executed by the processor, further cause the communication device to:
in a case where a third signal including the predetermined character string is received from a third external device under a situation where the third value is set as the upper limit child station number in the communication device and the participating child station number is equal to the third value, set the first value instead of the third value as the upper limit child station number in the communication device; and in a case where the first value is set instead of the third value as the upper limit child station number in the communication device due to the third signal being received from the third external device under the situation where the participating child station number is equal to the third value, establish a wireless connection with the third external device via the first wireless interface so as to cause the third external device to participate as a child station in the wireless network,
wherein in a case where the first signal is received from the first external device under a situation where the participating child station number is equal to the first value after the first value has been set instead of the third value as the upper limit child station number in the communication device, the second value is set instead of the first value as the upper limit child station number in the communication device, and
in a case where the second value is set instead of the first value as the upper limit child station number in the communication device due to the first signal being received from the first external device under the situation where the participating child station number is equal to the first value after the first value has been set instead of the third value as the upper limit child station number in the communication device, the wireless connection with the first external device is established via the first wireless interface so as to cause the first external device to participate as the child station in the wireless network.

7. The communication device as in claim 1, wherein the computer-readable instructions, when executed by the processor, further cause the communication device to:
in a case where the first signal is received from the first external device under a situation where the first value is set as the upper limit child station number in the communication device and the participating child station number is less than the upper limit child station number, set the second value instead of the first value as the upper limit child station number in the communication device, wherein in a case where the second signal is received from the second external device under the situation where the first value is set as the upper limit child station number in the communication device and the participating child station number is less than the upper limit child station number, the first value is maintained as the upper limit child station number.

8. The communication device as in claim 1, wherein the main memory is configured to store a value indicating the upper limit child station number,
the first wireless interface comprises an interface memory configured to store a value indicating the upper limit child station number, and
in a case where the first signal is received from the first external device under a situation where the first value is stored as the upper limit child station number in each of the main memory and the interface memory, and the participating child station number is equal to the first value, the second value is set instead of the first value as the upper limit child station number in the communication device by changing the first value stored in the main memory to the second value and by supplying an instruction for changing the first value stored in the interface memory to the second value to the first wireless interface.

9. The communication device as in claim 1, wherein the computer-readable instructions, when executed by the processor, further cause the communication device to:

disconnect the wireless connection with the first external device in a case where a specific communication using the wireless network is completed between the communication device and the first external device after the upper limit child station number has been set to the second value instead of the first value and the first external device has participated in the wireless network as the child station; and set the first value instead of the second value as the upper limit child station number in the communication device in a case where the wireless connection with the first external device is disconnected.

10. A communication device comprising:

a first wireless interface;

a second wireless interface different from the first wireless interface, a maximum distance with which a wireless communication can be executed via the second wireless interface is shorter than a maximum distance with which a wireless communication can be executed via the first wireless interface, a processor; and a main memory storing computer-readable instructions therein, the computer-readable instructions, when executed by the processor, causing the communication device to:

in a case where a first signal is received from a first external device via the second wireless interface under a situation where a participating child station number is less than an upper limit child station number, establish a wireless connection with the first external device via the first wireless interface so as to cause the first external device to participate as a child station in a wireless network in which the communication device operates as a parent station, the participating child station number being a number of child stations currently participating in the wireless network, and the upper limit child station number being an upper limit of a number of child stations that are allowed to participate in the wireless network;

in a case where a second signal is received from a second external device via the first wireless interface, without receiving the first signal from the second external device via the second wireless interface, under the situation where the participating child station number is less than the upper limit child station number, establish a wireless connection with the second external device via the first wireless interface so as to cause the second external device to participate in the wireless network as a child station;

in a case where the first signal is received from the first external device via the second wireless interface under a situation where a first value is set as the upper limit child station number in the communication device and the participating child station number is equal to the first value, set a second value instead of the first value as the upper limit child station number in the communication device, the second value being greater than the first value, wherein in a case where the second signal is received from the second external device via the first wireless interface, without receiving the first signal from the second external device via the second wireless interface, under the situation where the first value is set as the upper limit child station number in the communication device and the participating child station number is equal to the first value, the first value is maintained as the upper limit child station number; and in a case where the second value is set instead of the first value as the upper limit child station number due to the first signal being received from the first external device via the second wireless interface under the situation where the participating child station number is equal to the first value, establish a wireless connection via the first wireless interface with the first external device so as to cause the first external device to participate as a child station in the wireless network, wherein in a case where the first value is maintained as the upper limit child station number due to the second signal being received from the second external device via the first wireless interface, without receiving the first signal from the second external device via the second wireless interface, under the situation where the participating child station number is equal to the first value, a wireless connection with the second external device is not established.

11. The communication device as in claim 10, wherein the first signal includes a predetermined character string, and the second signal does not include the predetermined character string.

12. The communication device as in claim 10, wherein the computer-readable instructions, when executed by the processor, further cause the communication device to:

in a case where a change request for requesting a change of the upper limit child station number is accepted from a user under the situation where the first value is set as the upper limit child station number in the communication device, set a third value instead of the first value as the upper limit child station number in the communication device, the third value being different from the first value.

13. The communication device as in claim 12, wherein the third value is less than the first value, the computer-readable instructions, when executed by the processor, further cause the communication device to:

in a case where a third signal is received from a third external device via the second wireless interface under a situation where the third value is set as the upper limit child station number in the communication device and the participating child station number is equal to the third value, set the first value instead of the third value as the upper limit child station number in the communication device, and in a case where the first value is set instead of the third value as the upper limit child station number in the communication device due to the third signal being received from the third external device via the second wireless interface under the situation where the participating child station number is equal to the third value, establish a wireless connection with the third external device via the first wireless interface so as to cause the third external device to participate as a child station in the wireless network, wherein in a case where the first signal is received from the first external device via the second wireless interface under a situation where the participating child station number is equal to the first value after the first value has been set instead of the third value as the upper limit child station number in the communication device, the second value is set instead of the first value as the upper limit child station number in the communication device, and in a case where the second value is set instead of the first value as the upper limit child station number in the communication device due to the first signal being received from the first external device via the second wireless interface under the situation where the participating child station number is equal to the first value after the first value has been set instead of the third value as the upper limit child station number in the communication device, the wireless connection with the first external device is established via the first wireless interface so as to cause the first external device to participate as the child station in the wireless network.

14. The communication device as in claim 10, wherein the computer-readable instructions, when executed by the processor, further cause the communication device to:

in a case where the first signal is received from the first external device via the second wireless interface under a situation where the first value is set as the upper limit child station number in the communication device and the participating child station number is less than the upper limit child station number, set the second value instead of the first value as the upper limit child station number in the communication device, wherein in a case where the second signal is received from the second external device via the first wireless interface, without receiving the first signal from the second external device via the second wireless interface, under the situation where the first value is set as the upper limit child station number in the communication device and the participating child station number is less than the upper limit child station number, the first value is maintained as the upper limit child station number.

15. The communication device as in claim 10, wherein the main memory is configured to store a value indicating the upper limit child station number, the first wireless interface comprises an interface memory configured to store a value indicating the upper limit child station number, and in a case where the first signal is received from the first external device under a situation where the first value is stored as the upper limit child station number in each of the main memory and the interface memory, and the participating child station number is equal to the first value, the second value is set instead of the first value as the upper limit child station number in the communication device by changing the first value stored in the main memory to the second value and by supplying an instruction for changing the first value stored in the interface memory to the second value to the first wireless interface.

16. The communication device as in claim 10, wherein the computer-readable instructions, when executed by the processor, further cause the communication device to:

disconnect the wireless connection with the first external device in a case where a specific communication using the wireless network is completed between the communication device and the first external device after the upper limit child station number has been set to the second value instead of the first value and the first external device has participated in the wireless network as the child station, and set the first value instead of the second value as the upper limit child station number in the communication device in a case where the wireless connection with the first external device is disconnected.

17. A non-transitory computer-readable recording medium storing computer-readable instructions for a terminal device, wherein the computer-readable instructions, when executed by a processor of the terminal device, cause the terminal device to:

receive a target SSID (abbreviation of Service Set Identifier) from a communication device via a second wireless interface of the terminal device, the target SSID being an SSID of a wireless network in which the communication device operates as a parent station;

send a predetermined signal including the target SSID and a predetermined character string to the communication device via a first wireless interface of the terminal device in a case where the target SSID is received, the predetermined character string being for setting a second value instead of a first value as an upper limit child station number in the communication device, the upper limit child station number being an upper limit of a number of child stations that are allowed to participate in the wireless network, wherein a maximum distance with which a wireless communication can be executed via the second wireless interface is shorter than a maximum distance with which a wireless communication can be executed via the first wireless interface; and supply an instruction for participating as a child station in the wireless network to the first wireless interface after the predetermined signal has been sent to the communication device.

* * * * *